(12) United States Patent
Hirano et al.

(10) Patent No.: US 6,519,403 B1
(45) Date of Patent: Feb. 11, 2003

(54) OPTICAL FIBER AND METHOD OF MAKING THE SAME

(75) Inventors: Masaaki Hirano, Yokohama (JP); Masashi Onishi, Yokohama (JP); Yoshio Yokoyama, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/466,798

(22) Filed: Dec. 20, 1999

(30) Foreign Application Priority Data

Dec. 22, 1998 (JP) ............................................. 10-364802

(51) Int. Cl.$^7$ ............................... G02B 6/02; G02B 6/22
(52) U.S. Cl. ........................ 385/127; 385/142; 385/144
(58) Field of Search ................................ 385/123, 126, 385/127, 142, 144

(56) References Cited

U.S. PATENT DOCUMENTS

| 4,747,663 A | * | 5/1988 | Huber | ........................ | 385/127 |
| 2001/0043782 A1 | * | 11/2001 | Yokoyama et al. | ......... | 385/127 |

OTHER PUBLICATIONS

"Novel Index Profile for Improved Large Effective Area Fiber", by Nouchi et al., International Wire & Cable Symposium Proceedings, 1996, pp. 939–945.
"Fiber Designs with Significantly Reduced Nonlinearity for Very Long Distance Transmission", by Hattori et al., Applied Optics, vol. 37, No. 15, May 20, 1998, pp. 3190–3197.
"Maximum Effective Area for Non–Zero Dispersion–Shifted Fiber", by P. Nouchi, OFC '98 Technical Digest, Thursday Morning, pp. 303–304.
"Dispersion–Shifted Single–Mode Fiber for High–Bit–Rate and Multiwavelength Systems", by V.A. Bhagavatula et al., OFC '95 Technical Digest, Thursday Morning, pp. 259–260.
"Large Effective Area Dispersion–Shifted Fibers with Dual–Ring Index Profiles", Y. Liu, et al., OFC '96 Technical Digest, Wednesday Afternoon, pp. 165–166.
"Single–Mode Dispersion–Shifted Fibers with Effective Area Over $100\mu m^2$", by Y. Liu et al., ECOC '98, Sep. 20–24, 1998, pp. 41–42.
"New Dispersion Shifted Fiber with Effective Area Larger Than $90\mu m^2$", by P. Nouchi et al., 22nd European Conference on Optical Communication, ECOC '96, pp. 49–52.
"Novel Ring–Core–Dispersion–Shifted Fiber with Depressed Cladding and its Four–Wave Mixing Efficiency", by M. Hirano, et al., ECOC '99, Sep. 26–30, 1999, pp. 278–279.

* cited by examiner

Primary Examiner—Cassandra Spyrou
Assistant Examiner—Alessandro V. Amari
(74) Attorney, Agent, or Firm—McDermott, Will & Emery

(57) ABSTRACT

An optical fiber is composed of silica glass and comprises a center core region doped with F element, a ring core region doped with $GeO_2$, and an inner cladding region doped with F element; wherein a buffer layer composed of undoped $SiO_2$ or $SiO_2$ doped with one or both of P and Cl or a concentration gradient region in which $GeO_2$ concentration radially decreases toward the boundary is provided between the center core region and the ring core region.

8 Claims, 23 Drawing Sheets

OPTICAL FIBER AND METHOD OF MAKING THE SAME

BACKGROUND OF THE INVENTION

1. Field of the Invention

The present invention relates to an optical fiber having a ring core portion, and a favorable method of making the same.

2. Related Background Art

Dispersion-shifted optical fibers have a zero-dispersion wavelength, where their chromatic dispersion value becomes zero, in the wavelength range of 1.55 μm. Known as one kind thereof are those of a ring-shaped structure in which a ring core region having a higher refractive index and a cladding region having a lower refractive index are disposed concentrically around a center core region. A dispersion-shifted optical fiber having such a ring-shaped structure of refractive index profile is manufactured by drawing an optical fiber preform having a similar refractive index profile.

The refractive index profile of this optical fiber preform can be realized by employing silica glass as a main ingredient, adding F (fluorine) element to a center core portion which is to become the center core region of the optical fiber, and adding $GeO_2$ (germanium dioxide) to a ring core portion which is to become the ring core region. This optical fiber preform is subjected to melt spinning, i.e., so-called drawing, an optical fiber having a desirable refractive index profile may be obtained.

SUMMARY OF THE INVENTION

However, upon drawing, the optical fiber preform is heated and, at this time, the F element added to the center core portion diffuses into its surrounding regions, whereas Ge added to the ring core portion diffuses into the center core portion and the outer cladding region. Due to this mutual diffusion, transmission loss would increase. Also, when Ge and F mingle with each other, then $GeF_4$ or GeO may be produced in a heating and unifying process, so as to generate bubbles, which deteriorate the quality of the optical fiber to be made. As a result, there has been a problem that desirable fiber characteristics may not be obtained.

In order to overcome the above-mentioned problem, it is an object of the present invention to provide an optical fiber of a ring-shaped structure having a region doped with F element and a region doped with Ge, which can be manufactured stably and has a desirable refractive index profile; and a method of making the same.

For overcoming the above-mentioned problem, the optical fiber in accordance with the present invention is composed of silica glass, having a center core region doped with F element and a ring core region doped with $GeO_2$, wherein a buffer layer made of undoped $SiO_2$ (silicon dioxide) or $SiO_2$ doped with both or one of P (phosphorus) and Cl (chlorine) is disposed between the center core region and the ring core region.

The optical fiber in accordance with the present invention can be made by drawing an optical fiber preform having a cross-sectional profile similar to that of this optical fiber. Namely, the optical fiber preform also has a buffer layer made of undoped $SiO_2$ or $SiO_2$ doped with one or both of P and Cl. When this optical fiber is drawn, the mutual diffusion of F and Ge between the ring core region and the center core region is suppressed due to the existence of buffer layer. The fact that this buffer layer exists in the resulting optical fiber indicates that the mutual dispersion suppressing effect sufficiently functions, so as to maintain fiber characteristics.

Preferably, the thickness of the buffer layer is at least 0.01 μm but not greater than 5 μm. If the buffer layer is thinner than the lower limit of this range, there is a possibility of the mutual diffusion of Ge and F occurring beyond the buffer layer. On the other hand, if the buffer layer is thicker than the upper limit of the range, the bending loss occurring when the optical fiber is bent may become unfavorably large.

Alternatively, the optical fiber in accordance with the present invention is composed of silica glass, having a center core region, a ring core region doped with $GeO_2$ (germanium dioxide), and an inner cladding region doped with F (fluorine) element which are arranged concentrically, wherein a buffer layer made of undoped $SiO_2$ or $SiO_2$ doped with both or one of P and Cl is disposed between the ring core region and the inner cladding region.

The mutual diffusion of F and Ge between the ring core region and the inner cladding region when drawing an optical fiber preform having a similar structure is suppressed due to the existence of buffer layer in this case as well. Similarly, the fact that this buffer layer exists in the resulting optical fiber indicates that the mutual dispersion suppressing effect sufficiently functions, so as to maintain fiber characteristics.

In this case, the thickness of the buffer layer is preferably 0.01 μm or greater. It is because of the fact that there is a possibility of the mutual diffusion of Ge and F occurring beyond the buffer layer if the buffer layer is thinner than this lower limit. On the other hand, the change in bending loss occurring upon bending the optical fiber depending on the thickness of the buffer layer in this case is smaller than that in the case where the buffer layer is formed between the ring core region and the center core region, whereby the buffer layer can be made thicker.

Alternatively, the optical fiber in accordance with the present invention is comprised of silica glass, having a center core region doped with F element and a ring core region doped with $GeO_2$; wherein, letting a [μm] be the radius of the center core region, and $C_G(r)$ [wt %] be the concentration of $GeO_2$ in the ring core region at a position separated from the center by a radius r [μm], the concentration gradient $y_{G1}$ [wt %·μm²] of $GeO_2$ in a boundary portion of the ring core region with respect to the center core region defined by:

$$y_{G1} = \int_{a}^{a+1} (rC_G(r)\exp(a-r))dr \quad (1)$$

is set to 100 wt %·μm² or less; or, letting $C_F(r)$ [wt %] be the concentration of F element in the center core region at a position separated from the center by a radius r [μm], the concentration gradient $y_{F1}$ [wt %·μm²] of F element in a boundary portion of the center core region with respect to the ring core region defined by:

$$y_{F1} = \int_{a-1}^{a} (rC_F(r)\exp(r-a))dr \quad (2)$$

is set to 18 wt %·μm² or less.

Alternatively, the optical fiber in accordance with the present invention is composed of silica glass, having a center core region, a ring core region doped with $GeO_2$, and an inner cladding region doped with F element which are arranged concentrically; wherein, letting b [μm] be the radius of the ring core region, and $C_G(r)$ [wt %] be the concentration of $GeO_2$ in the ring core region at a position separated from the center by a radius r [μm], the concentration gradient $y_{G2}$ [wt %·μm$^2$] of $GeO_2$ in a boundary portion of the ring core region with respect to the inner cladding region defined by:

$$y_{G2} = \int_{b-1}^{b} (rC_G(r)\exp(r-b))\,dr \quad (3)$$

is set to 180 wt %·μm$^2$ or less; or, letting $C_F(r)$ [wt %] be the concentration of F in the inner cladding region at a position separated from the center by a radius r [μm], the concentration gradient $y_{F2}$ [wt %·μm$^2$] of F element in a boundary portion of the inner cladding region with respect to the ring core region defined by:

$$y_{F2} = \int_{b}^{b+1} (rC_F(r)\exp(b-r))\,dr \quad (4)$$

is set to 30 wt %·μm$^2$ or less.

The diffusion velocity of the above-mentioned mutual diffusion of Fe and Ge generated upon drawing results from the concentration gradient in the boundary portion between the region doped with F element and the region doped with $GeO_2$. The inventors have found that, when the radial distribution of doping amount of $GeO_2$ or F element in each region is set such that the weighted concentration gradients $y_{G1}$, $y_{F1}$, $y_{G2}$, $y_{F2}$ in boundary portions defined by equations (1) to (4) become predetermined values or less, the diffusion velocity of F and Ge lowers, thereby suppressing the mutual diffusion. As a consequence, desirable fiber characteristics are reliably obtained.

On the other hand, the method of making an optical fiber in accordance with the present invention comprises steps of: (1) preparing a silica glass pipe having a layer doped with $GeO_2$ at least on an inner periphery side thereof; (2) depositing undoped $SiO_2$ or $SiO_2$ doped with one or both of P and Cl onto the inside of the silica glass pipe, so as to produce a buffer layer; (3) inserting a silica glass rod doped with F element into the inside of the buffer layer, and then heating and unifying the silica glass rod and the buffer layer, so as to prepare an intermediate preform; and (4) melt-spinning an optical fiber preform including the intermediate preform. According to this method, an optical fiber having the above-mentioned buffer layer can be made favorably.

Alternatively, the method of making an optical fiber in accordance with the present invention comprises steps of: (1) preparing a silica glass pipe having a layer doped with $GeO_2$ at least on an inner periphery side thereof; (2) heating the silica glass pipe, so as to evaporate $GeO_2$ in its inner surface and eliminate at least a part thereof; (3) inserting a silica glass rod doped with F element into the inside of the silica glass pipe, and then heating and unifying the silica glass rod and the silica glass pipe, so as to prepare an intermediate preform; and (4) melt-spinning an optical fiber preform including the intermediate preform. According to this method, the above-mentioned optical fiber in which the germanium dioxide concentration in the vicinity of the boundary portion of the ring core region is lowered can be made favorably.

The method of making an optical fiber having an inner cladding region in accordance with the present invention includes the following three methods. The first method comprises steps of: (1) preparing a silica glass pipe having a layer doped with F at least on an inner periphery side thereof; (2) depositing undoped $SiO_2$ or $SiO_2$ doped with one or both of P and Cl onto the inside of the silica glass pipe, so as to form a buffer layer; (3) further forming at an inner peripheral portion thereof a glass layer doped with $GeO_2$, so as to produce an intermediate pipe; (4) inserting a silica glass rod into the inside of the intermediate pipe, and then heating and unifying the silica glass rod and the intermediate pipe, so as to prepare an intermediate preform; and (5) melt-spinning an optical fiber preform including the intermediate preform.

The second method comprises steps of: (1) concentrically forming, successively from the axial center side, a silica layer, a layer doped with $GeO_2$, and an undoped layer or a layer doped with one or both of P and Cl, so as to prepare a silica glass rod; (2) preparing a silica glass pipe having a layer doped with F element at least on an inner periphery side thereof; (3) inserting the silica glass rod into the silica glass pipe, and then heating and unifying the silica glass rod and the silica glass pipe, so as to prepare an intermediate preform; and (4) melt-spinning an optical fiber preform including the intermediate preform.

The third method comprises the steps of (1) and (2) steps of the first method; (3) forming a silica glass rod having a silica layer at the axial center and a layer doped with germanium dioxide therearound; (4) inserting the silica glass rod into the inside of the buffer layer, and then heating and unifying the silica glass rod and the buffer layer, so as to prepare an intermediate preform; and (5) melt-spinning an optical fiber preform including the intermediate preform. According to any of these methods, the optical fiber in accordance with the present invention having a buffer layer between the inner cladding region and the ring core region can be made favorably.

In the step of preparing the silica glass pipe in these methods, a silica glass rod having a layer doped with fluorine element or germanium dioxide at least on the inner periphery side thereof may be plastically deformed at a high temperature, so as to form an opening penetrating through the axial center, thereby yielding a glass pipe. Hence, a required silica glass pipe can be formed favorably.

Another method of making an optical fiber in accordance with the present invention comprises steps of: (1) preparing a silica glass rod having a silica layer on the axial center side and a ring-shaped layer doped with germanium dioxide disposed on the outside thereof; (2) opening the silica glass rod along the axis, so as to prepare a silica glass pipe; (3) inserting a silica glass rod doped with fluorine element into the inside of the silica glass pipe, and then heating and unifying the silica glass rod and the silica glass pipe, so as to form an intermediate preform; and (4) melt-spinning an optical fiber preform including the intermediate preform. The above-mentioned optical fiber having a buffer layer can favorably be made by this method as well.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1 is a lateral sectional view showing a structure of a first embodiment of the optical fiber in accordance with the present invention, whereas

FIG. 3 is a flowchart of a first method of making the optical fiber of FIG. 1, whereas

FIG. 5 is a flowchart of a second method of making the optical fiber of FIG. 1, whereas

FIG. 7 is a flowchart of a third method of making the optical fiber of FIG. 1, whereas

FIG. 10 is a graph showing relationships between the thickness of an inner buffer layer and the transmission loss in optical fibers, whereas

FIG. 12 is a graph showing relationships between the thickness of an outer buffer layer and the transmission loss in optical fibers, whereas

FIG. 14 is a lateral sectional view showing a structure of a second embodiment of the optical fiber in accordance with the present invention, whereas

FIG. 16 is a flowchart of a method of making the optical fiber of FIG. 14, whereas

DESCRIPTION OF THE PREFERRED EMBODIMENTS

Figure 1:
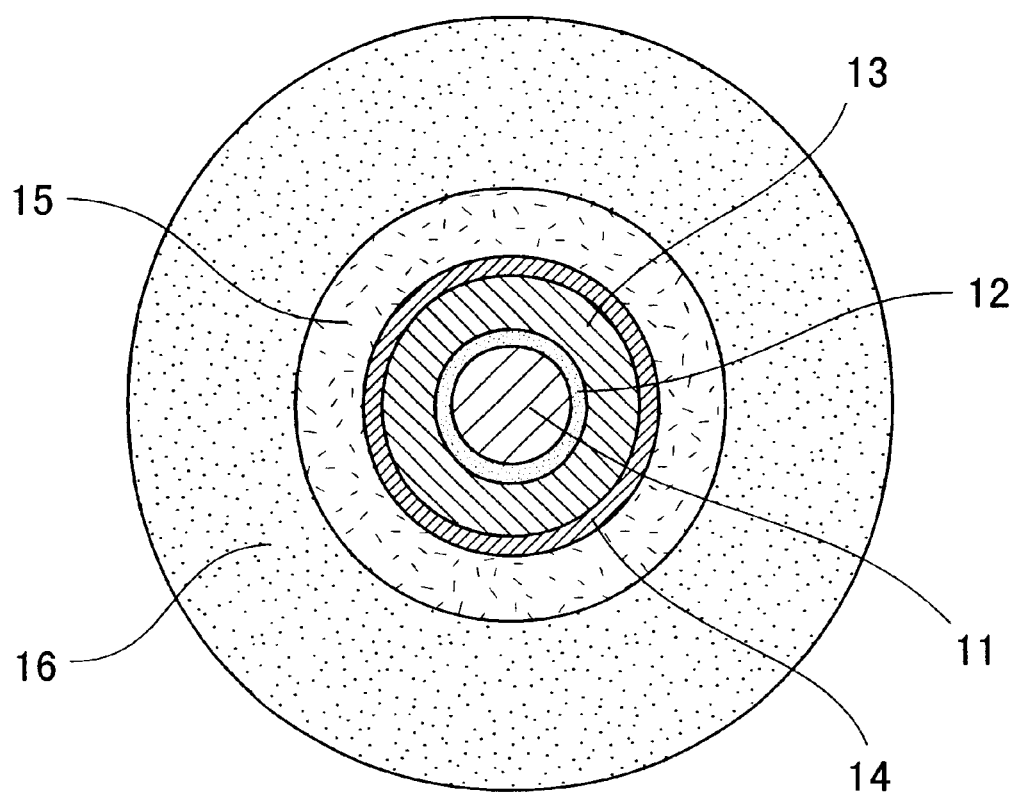

In the following, preferred embodiments of the present invention will be explained with reference to the accompanying drawings. To facilitate the comprehension of the explanation, the same reference numerals denote the same parts, where possible, throughout the drawings, and a repeated explanation will be omitted.

Figure 2:
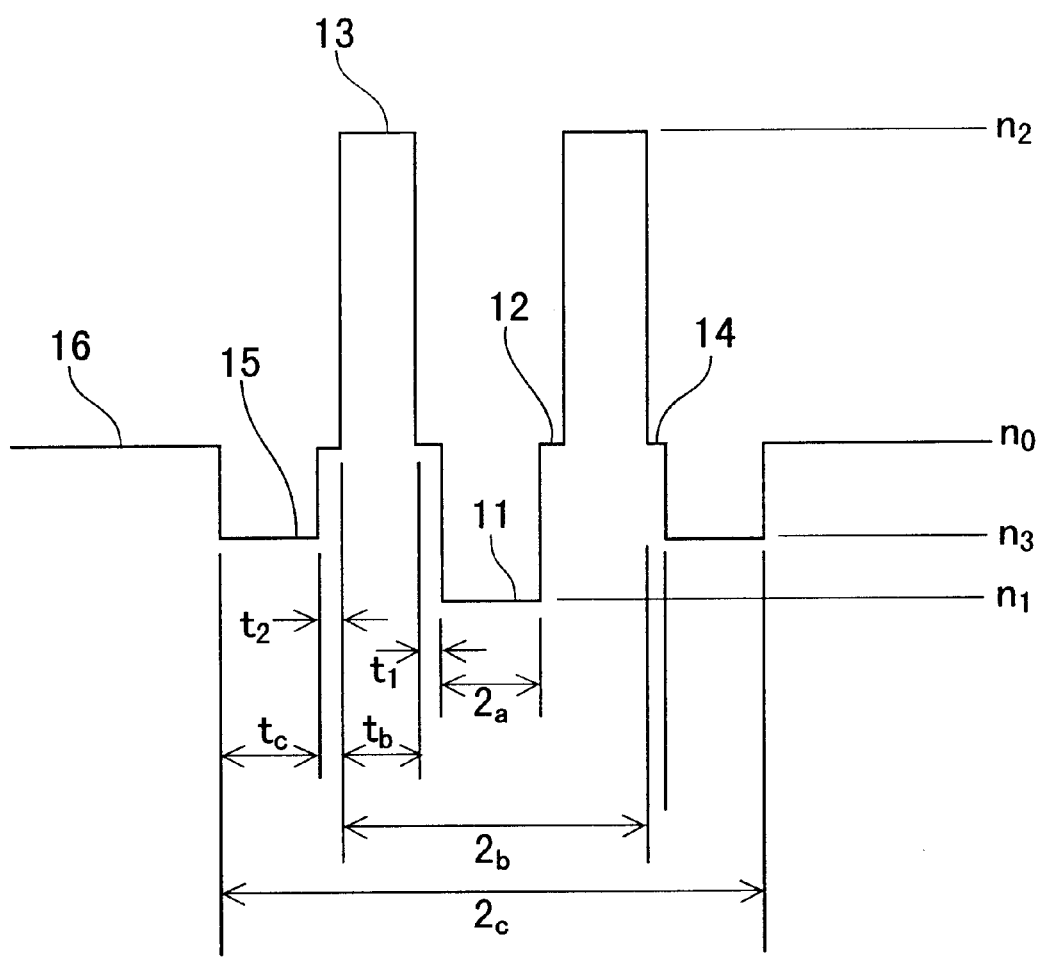
FIG. 2 is a chart showing the refractive index profile thereof.

FIG. 1 is a view showing a cross-sectional structure of a first embodiment of the optical fiber in accordance with the present invention, whereas FIG. 2 shows the refractive index profile thereof.

The optical fiber in accordance with the first embodiment is made of silica glass, and is constituted, as shown in FIGS. 1 and 2, by a center core region 11 (having an outside diameter $2a$), an inner buffer layer 12 (having a thickness $t_1$), a ring core region 13 (having an outside diameter $2b$ and a thickness $t_b$), an outer buffer layer 14 (having a thickness $t_2$), an inner cladding region 15 (having an outside diameter $2c$ and a thickness $t_c$), and an outer cladding region 16, all of which are concentrically arranged successively from the center. Among them, both of the inner and outer buffer layers 12, 14 and the outer cladding region 16 are made of pure silica including substantially no additives except for P or Cl and have a refractive index $n_0$, the center core region 11 is doped with an adjusted amount of fluorine element so as to yield a refractive index $n_1$ which is lower than $n_0$, the ring core region 13 is doped with an adjusted amount of germanium dioxide so as to yield a refractive index $n_2$ which is higher than $n_0$, and the inner cladding region 15 is doped with fluorine element so as to yield a refractive index $n_3$ which is lower than $n_0$.

The outside diameter $2a$ of the center core region 11 is a few micrometers, the outside diameter $2b$ of the ring core region 13 is on the order of a few micrometers to 10 μm (the thickness $t_b$ being about a few micrometers), the outside diameter $2c$ of the inner cladding region 15 is a few micrometers to a few tens of micrometers (the thickness tc being on the order of a few micrometers to 10 μm, and the outside diameter of the outer cladding region 16 is normally 125 μm. Also, each of the respective thicknesses $t_1$, $t_2$ of the buffer layers 12, 14 is on the order of 0.01 to 5 μm. The relative refractive index difference $\Delta n^- = (n_1 - n_0)/n_0$ of the center core region 11 with reference to the refractive index $n_0$ of the outer cladding region 16 is −0.2% to −0.7%, and the relative refractive index difference $\Delta n^+ = (n_2 - n_0)/n_0$ of the ring core region 13 with reference to the refractive index $n_0$ of the outer cladding region 16 is on the order of 0.5% to 1.5%.

Figure 3:
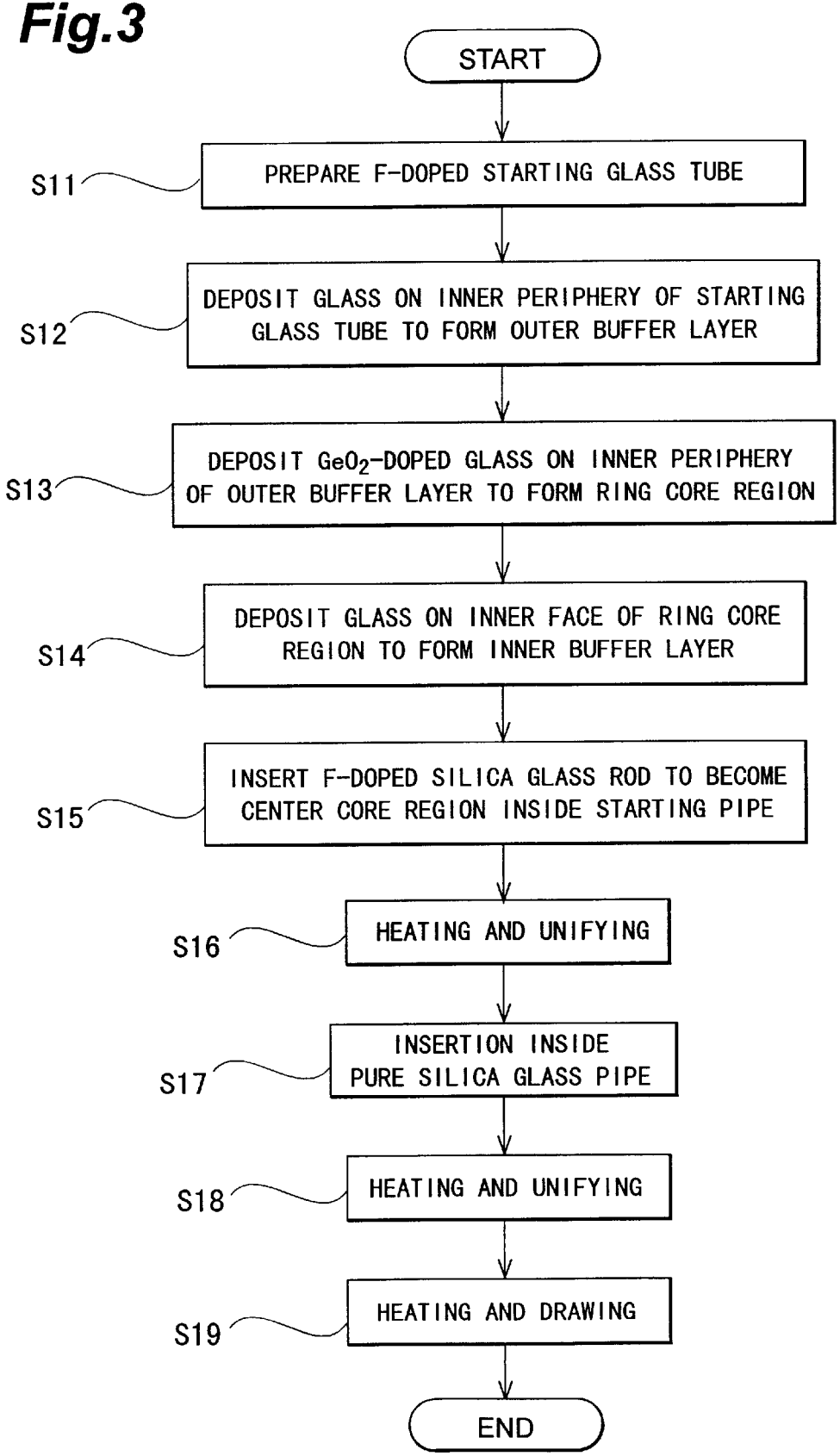

Two kinds of different methods among methods of making this optical fiber will now be explained by way of example. FIG. 3 is a flowchart of a first method of making the optical fiber of FIG. 1, whereas FIGS. 4A to 4H are lateral sectional views showing the respective intermediate products at individual steps thereof.

Figure 4A:
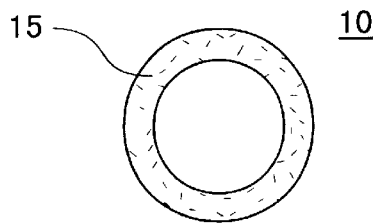
FIGS. 4A to 4H are lateral sectional views showing the respective intermediate products at individual steps thereof.

First, at step S11, a starting glass tube 10 made of silica glass doped with F element is prepared (FIG. 4A). This starting glass tube 10 is to become an inner cladding region 15 having a low refractive index in the optical fiber, and has a tubular form with an inside diameter of 14 mm, an outside diameter of 25 mm, and a length of 300 mm, for example. Here, the concentration of doping F element is preferably on the order of 0.4 wt % to 1.5 wt %.

Figure 4B:
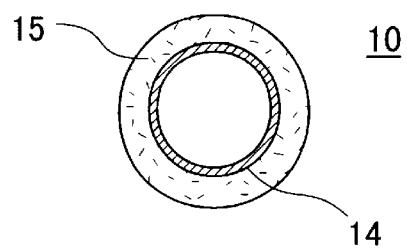
Figure 4C:
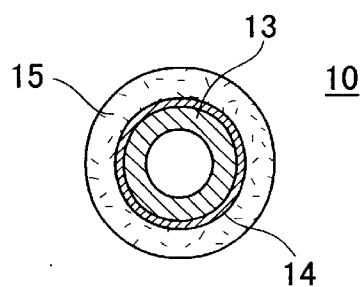
Figure 4D:
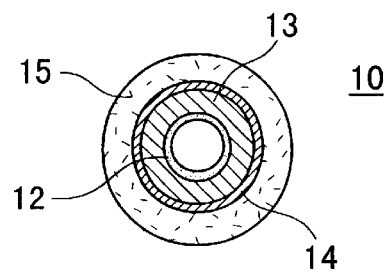

At step S12, undoped $SiO_2$ or $SiO_2$ doped with one or both of P and Cl is deposited with a thickness of about 0.06 mm on the inner peripheral face of the starting glass tube 10 by a CVD technique, so as to form the outer buffer layer 14 (FIG. 4B). Adding P or Cl to the outer buffer layer 14 adjusts the viscosity differences between this layer and the layers formed on both sides thereof, so that the drawing can stably be carried out when making the optical fiber. Subsequently, at step S13, $SiO_2$ doped with $GeO_2$ is deposited with a thickness of about 1.7 mm on the inner peripheral face of the outer buffer layer 14 by the CVD technique, so as to form the ring core region 13 (FIG. 4C). The concentration of $GeO_2$ added here is preferably on the order of 10 wt % to 30 wt %. As a consequence, the ring core region 13 attains a high refractive index. Further, at step S14, undoped $SiO_2$ or $SiO_2$ doped with one or both of P and Cl is deposited with a thickness of about 0.04 mm on the inner peripheral face of the ring core region 13 by the CVD technique, so as to form the inner buffer layer 12 (FIG. 4D). As a result, a multilayer glass tube 10 having an inside diameter of about 12.2 mm is obtained.

Adding P or Cl to silica glass forming the buffer layers 12, 14 can adjust the viscosity of each layer at the time of heating and melting, whereby the heating and drawing explained later can be carried out easily and reliably.

Figure 4E:
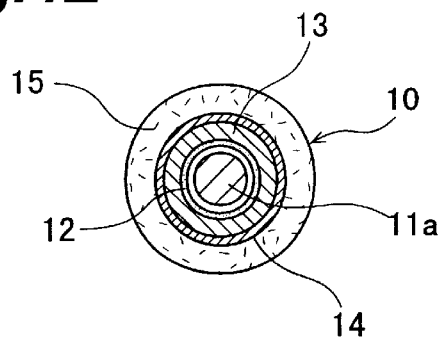

At step S15, a silica glass rod 11a doped with F element, which is to become the center core region 11, is inserted into the inside of thus formed multilayer glass tube 10 (FIG. 4E). Here, the F element concentration in the center core region 11 is on the order of 0.5 wt % to 2.5 wt %. At this time, a gap may be formed between the multilayer glass tube 10 and the silica glass rod 11a. However, for yielding an optical fiber whose core region has a low ellipticity, the gap is preferably as small as possible. Also, before the insertion, both or one of the multilayer glass tube 10 and the silica glass rod 11a may be surface-treated with an HF solution or heated and extended until an appropriate diameter is attained. In the case where an oxygen/hydrogen flame is utilized for heating and extending the silica glass rod 11a, the surface treatment with the HF solution is essential for eliminating the moisture attached to the surface of the silica glass rod 11a.

Figure 4F:
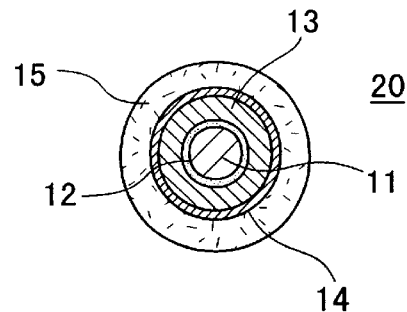

At step S16, the multilayer glass tube 10 in the state where the silica glass rod 11a is inserted therein is heated under a reduced pressure so as to unify them together, whereby a multilayer silica glass rod 20 is obtained (FIG. 4F). This heating and unifying step is carried out in an atmosphere of $Cl_2$ gas or a mixed gas made of $Cl_2$ gas and $O_2$ gas.

Figure 4G:
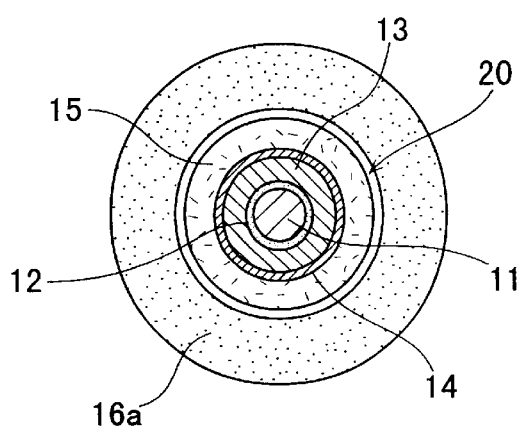

At step S17, this multilayer silica glass rod 20 is inserted into the inside of a pure silica glass tube 16a (FIG. 4G). This pure silica glass tube 16a is to become the outer cladding region 16 having a low refractive index in the optical fiber. Here, before the insertion, the multilayer silica glass rod 20 may be surface-treated with an HF solution or heated and extended until an appropriate diameter is attained. In the case where an oxygen/hydrogen flame is employed for heating and extending the multilayer silica glass rod 20, the surface treatment with the HF solution is essential for eliminating the moisture attached to the surface thereof.

Figure 4H:
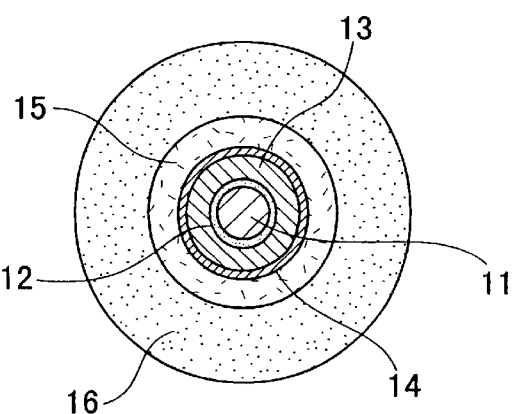

Then, at step S18, the silica glass tube 16a in the state where the multilayer silica glass rod 20 is inserted therein is heated under a reduced pressure so as to unify them together (FIG. 4H). As a result of the foregoing steps, an optical fiber preform is obtained. To extend a reduced length for optical fiber the optical fiber preform may be provided with an outer cladding by known VAD or OVD method. Thus manufactured optical fiber preform has a refractive index profile similar to that of the optical fiber shown in FIG. 2.

At step S19, this optical fiber preform is heated and drawn by a known technique, so as to yield an optical fiber having a desirable refractive index profile. When an optical fiber preform having such a refractive index profile is employed, the mutual diffusion of Ge atoms from the ring core region 13 to the center core region 11 and inner cladding region 15 caused by the diffusion of F atoms in the directions opposite thereto is prevented due to the existence of the buffer layers 12, 14 from occurring at the time of heating and drawing. Namely, the flowing of F atoms into the ring core region 13 and the flowing of Ge atoms from this region are suppressed, whereby the optical fiber can be prepared while the ring core region 13 is kept at a high refractive index state. Consequently, an optical fiber having favorable characteristics as a dispersion-shifted fiber can be obtained.

Figure 5:
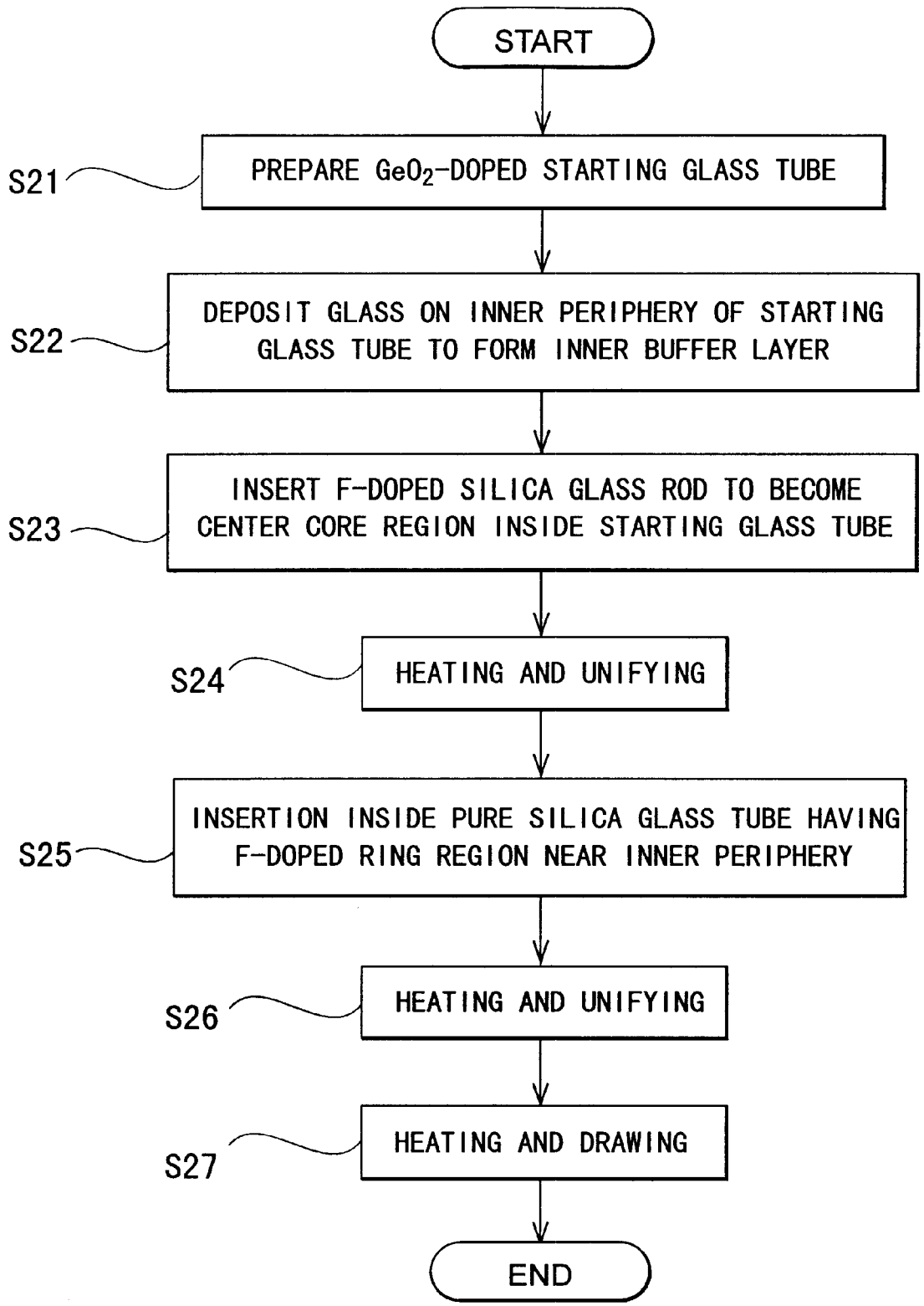

A second manufacturing method will now be explained with reference to FIGS. 5 and 6A to 6F. FIG. 5 is a flowchart showing this second manufacturing method, whereas FIGS. 6A to 6F are lateral sectional views showing the respective intermediate products at individual steps thereof.

Figure 6A:
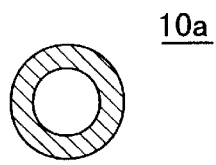
FIGS. 6A to 6F are lateral sectional views showing the respective intermediate products at individual steps thereof.

First, at step S21, a silica glass tube 10a doped with $GeO_2$ is prepared (FIG. 6A). This silica glass tube 10a is to become the ring core region 13 having a high refractive index in the optical fiber, and has a tubular form with an inside diameter of about 15 mm, an outside diameter of about 24 mm, and a length of about 300 mm, for example. Its $GeO_2$ concentration is preferably 10 wt % to 30 wt %.

Figure 6B:
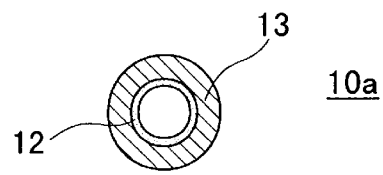
Figure 6C:
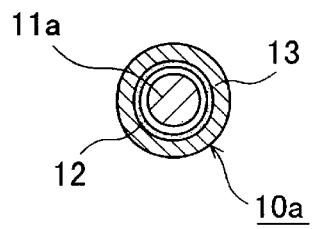

At step S22, undoped $SiO_2$ or $SiO_2$ doped with one or both of P and Cl is deposited with a thickness of about 0.3 mm on the inner peripheral face of the starting silica glass tube 10a by a CVD technique, so as to form the inner buffer layer 12 (FIG. 6B).

At step S23, a silica glass rod 11a doped with F element, which is to become the center core region 11, is inserted into the inside of the silica glass tube 10a in which the buffer layer 12 (FIG. 6C) is formed. The F element concentration in the silica glass rod 11a is 0.5 wt % to 2.5 wt %. At this time, a gap may be formed between the silica glass tube 10a and the silica glass rod 11a. However, for yielding an optical fiber whose core region has a low ellipticity, the gap is preferably as small as possible. Also, before the insertion, both or one of the silica glass tube 10a and the silica glass rod 11a may be surface-treated with an HF solution or heated and extended until an appropriate diameter is attained. In the case where an oxygen/hydrogen flame is utilized for heating and extending the silica glass rod 11a, the surface treatment with the HF solution is essential for eliminating the moisture attached to the surface of the silica glass rod 11a.

Figure 6D:
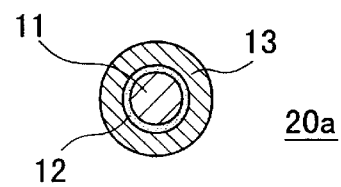

At step S24, the silica glass tube 10a in the state where the silica glass rod 11a is inserted therein is heated so as to unify them together (FIG. 6D). This heating and unifying step is carried out in an atmosphere of $Cl_2$ gas or a mixed gas made of $Cl_2$ gas and $O_2$ gas. Thus, a multilayer silica glass rod 20a is obtained.

Figure 6E:
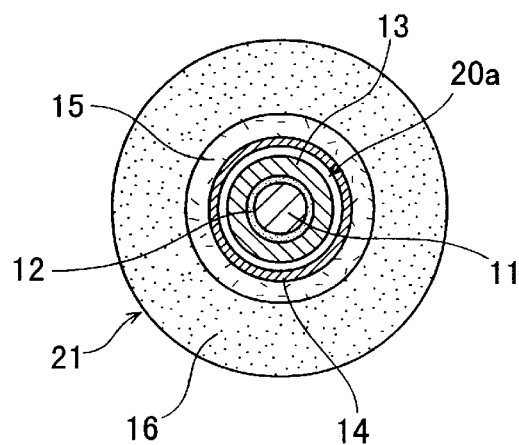

At step S25, the multilayer silica glass rod 20a is inserted into the inside of a silica glass tube 21 having a region doped with F atoms on the inner periphery side and pure silica regions on both sides thereof (FIG. 6E). Here, the region doped with F atoms becomes the inner cladding region 15, the outer pure silica region becomes the outer cladding region 16, and the inner pure silica region becomes the outer buffer layer 14. Here, before the insertion, the multilayer silica glass rod 20a may be surface-treated with an HF solution or heated and extended until an appropriate diameter is attained. In the case where an oxygen/hydrogen flame is employed for heating and extending the multilayer silica glass rod 20a, the surface treatment with the HF solution is essential for eliminating the moisture attached to the surface thereof.

Figure 6F:
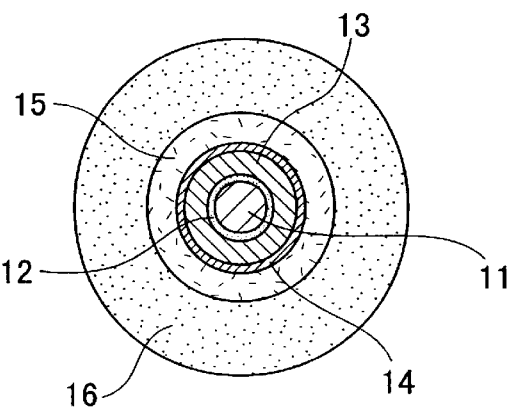

At step S26, the multilayer silica glass tube 21 in the state where the multilayer silica glass rod 20a is inserted therein is heated so as to unify them together (FIG. 6F). As a result of the foregoing steps, an optical fiber preform is obtained. To extend a reduced length for optical fiber the optical fiber preform may be provided with an outer cladding by known VAD or OVD method. Thus manufactured optical fiber preform has a refractive index profile similar to that of the optical fiber shown in FIG. 2.

At step S27, the optical fiber preform thus obtained is heated and drawn by a known technique, so as to yield an optical fiber having a desirable refractive index profile. The optical fiber preform obtained at step S26 has a structure similar to that of the optical fiber obtained at step S18 in the first manufacturing method whose flowchart is shown in FIG. 3, whereby effects similar to those in the first manufacturing method are obtained in the second manufacturing method as well. Namely, an optical fiber having favorable characteristics as a dispersion-shifted optical fiber is obtained.

Figure 7:
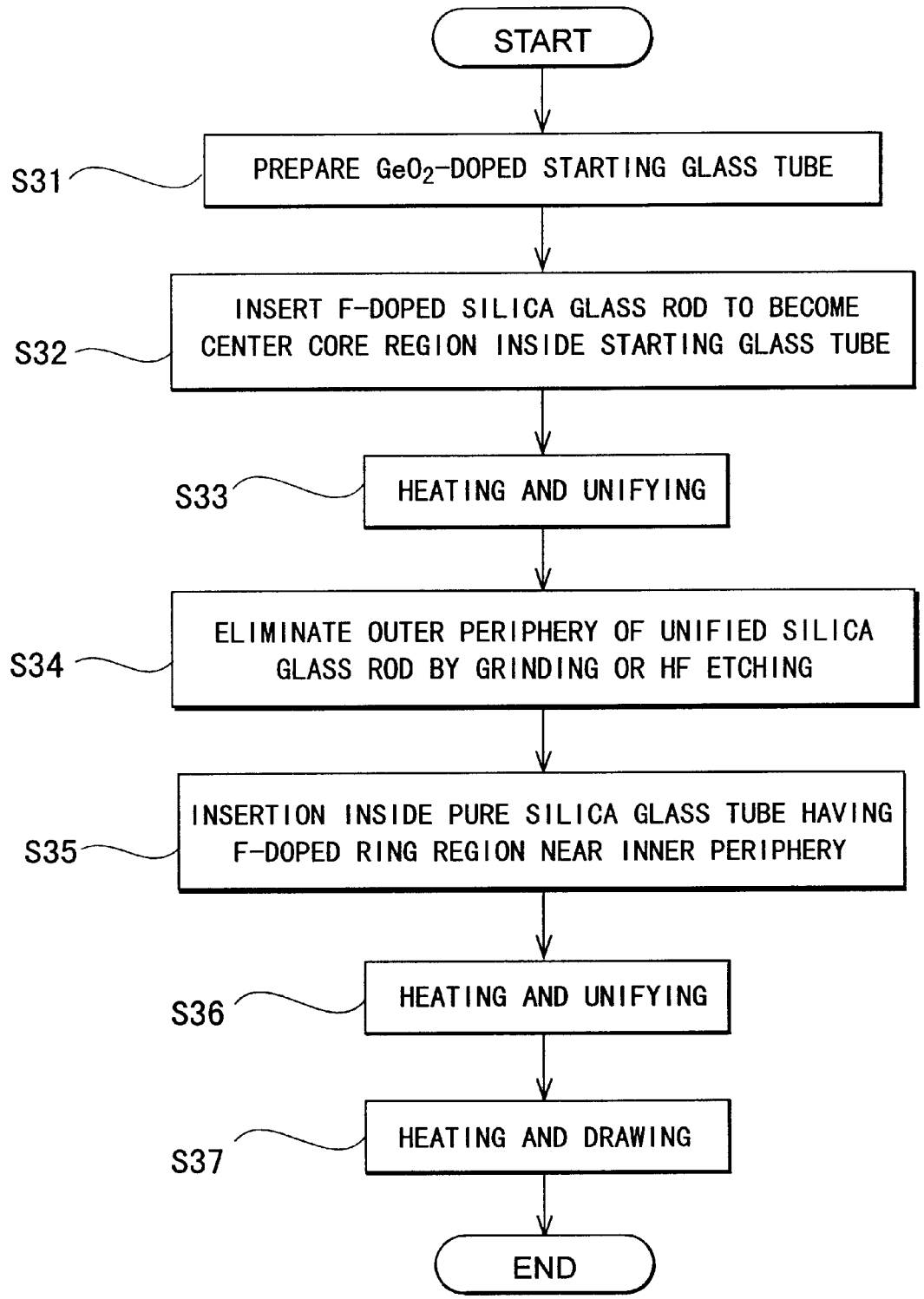

A third manufacturing method will now be explained with reference to FIGS. 7 and 8A to 8F. FIG. 7 is a flowchart showing this third manufacturing method, whereas FIGS. 8A to 8F are lateral sectional views showing the respective intermediate products at individual steps thereof.

Figure 8A:
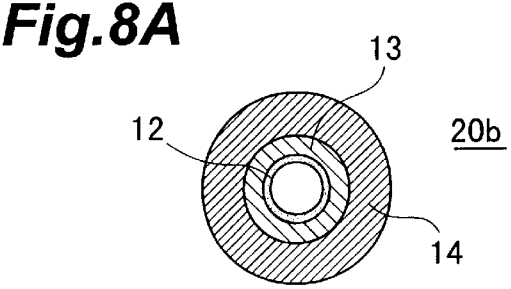
FIGS. 8A to 8F are lateral sectional views showing the respective intermediate products at individual steps thereof.
Figure 8B:
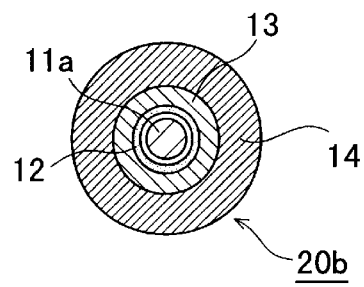

First, at step S31, a multiplex silica glass tube 20b is prepared (FIG. 8A). This multiplex silica glass tube 20b is to become the ring core region 13 having a high refractive index in the optical fiber and the regions of buffer layers 12, 14 at its inner and outer peripheries; and is set such that its inside diameter is 14.4 mm, the inside and outside diameters of the ring core region 13 are 15 mm and 24 mm, respectively, and the outside diameter as a whole is, for example, 30 mm. Details of a method of making this multiplex silica glass tube will be explained later.

Figure 8C:
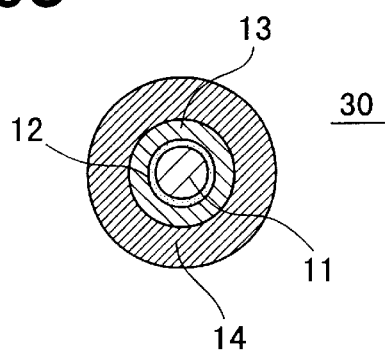

A silica glass rod 11a doped with F element, which is to become the center core region 11, is inserted into the inside of the silica glass tube 20b at step S32 (FIG. 8B), and they are heated in this inserted state so as to be unified together at step S33 (FIG. 8C). Since the details of these steps are identical to those of the above-mentioned steps S23, S24, they will not be explained here.

Figure 8D:
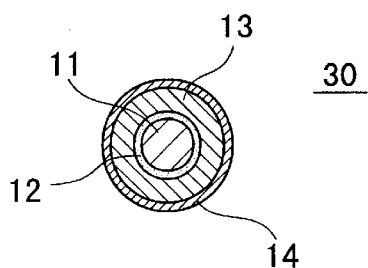
Figure 8E:
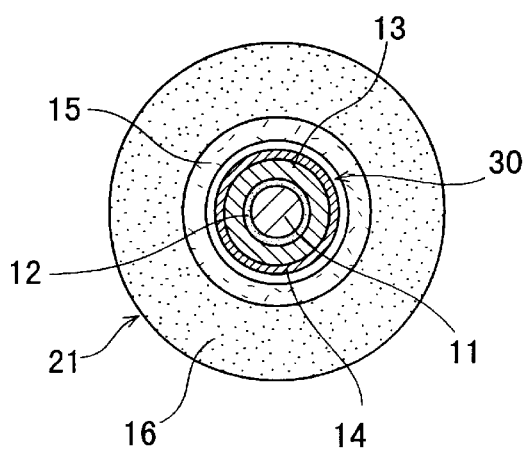

At step S34, the outer peripheral face of the unified silica glass rod 30 is eliminated by grinding or etching with an HF solution, so as to process the silica glass rod 30 such that its outside diameter becomes 1.1 times that of the ring core region 13 (FIG. 8D).

Figure 8F:
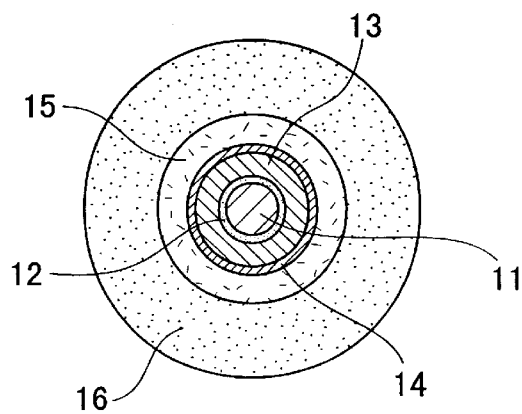

Thus processed silica glass rod 30 is inserted into the inside of a silica glass tube 21 having a region 15 doped with F atoms on the inner periphery side and pure silica region on outer side thereof at step S35 (FIG. 8E), and they are heated in this inserted state at step S36, so as to be unified (FIG. 8F). Since the details of these steps are identical to those of the above-mentioned steps S25, S26, they will not be explained here. As a result of the foregoing steps, an optical fiber preform is obtained. Thus manufactured optical fiber preform has a refractive index profile similar to that of the optical fiber shown in FIG. 2.

At step S37, the optical fiber preform thus obtained is heated and drawn by a known technique, so as to yield an optical fiber having a desirable refractive index profile. The optical fiber preform obtained at step S36 has a structure similar to that of the optical fibers obtained by the first and second manufacturing methods whose flowcharts are shown in FIGS. 3 and 5, whereby effects similar to those in the first and second manufacturing methods are obtained in the third manufacturing method as well. Namely, an optical fiber having favorable characteristics as a dispersion-shifted optical fiber is obtained.

For making various silica glass tubes used in the individual manufacturing methods, various techniques can be employed. For example, after a soot body is deposited on the outer periphery of a silica glass rod so as to produce a multilayer glass rod, the inner glass rod may be eliminated by boring or the like, so as to make a glass tube. Also, after a glass rod is produced by a known VAD or OVD technique, the inner glass rod may be eliminated by boring or the like, so as to make a glass tube.

Figure 9A:
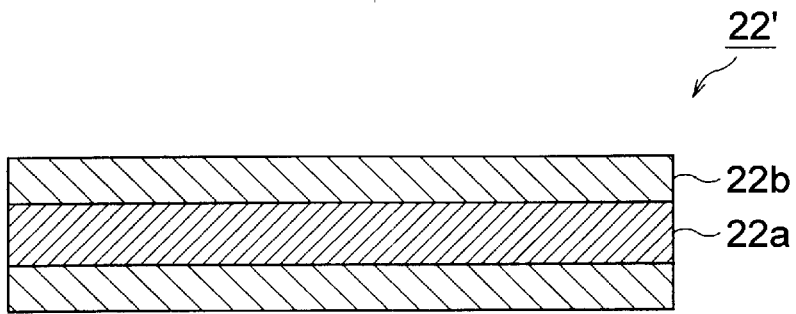
FIGS. 9A to 9C are longitudinal sectional views showing respective steps of a method of making a silica glass tube.
Figure 9B:
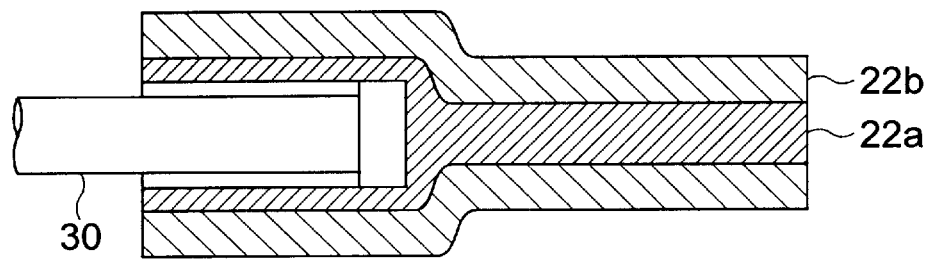
Figure 9C:
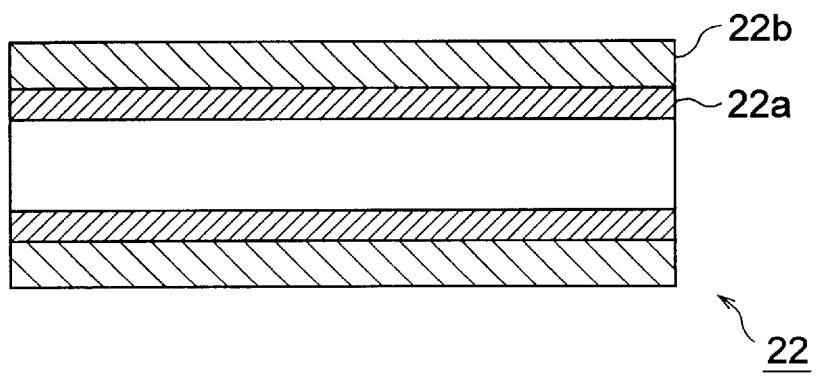

In addition, piercing may be utilized to manufacture a silica glass tube. This manufacturing method will now be explained with reference to FIGS. 9A to 9C. FIGS. 9A to 9C are longitudinal sectional views showing the respective intermediate products at individual steps of this manufacturing method. Though an example in which a two-layer glass tube is made will be explained here, it is also applicable to the making of a single-layer glass tube or a multilayer glass tube having three or more layers.

First, a known VAD technique, OVD technique, or the like is utilized so as to make a glass rod 22' having a region 22a in the vicinity of the axial center and an outer peripheral region 22b surrounding it (FIG. 9A). Then, this glass rod 22' is heated in an inactive gas atmosphere to a temperature not lower than 1500° C. which is the softening temperature slightly lower than the melting point; and a rod 30 made of a heat-resistant material, such as tungsten, alumina, or carbon, for example, is inserted therein along the center axis as shown in FIG. 9B, so as to plastically deform the glass rod 22', thus forming an opening along the center axis (piercing), whereby a silica glass tube 22 shown in FIG. 9C is obtained.

Thereafter, the surface of this silica glass pipe is dissolved with an HF solution having a concentration of 5% to 50%; or the silica glass pipe is heated to 1000° C. or higher, and processed by vapor-phase etching with $SF_6$ gas or the like, so as to eliminate at least 10 $\mu$m of the inner peripheral face, thereby smoothing it. As a consequence, after the processing, a silica glass pipe 22 having an inner face roughness of 10 $\mu$m or less, in which the boundary position between the inner region 22a and the outer region 22b deviates little in the axial direction, is obtained. Here, an $SiO_2$-$GeO_2$ glass layer may be deposited on the inner peripheral face of a silica glass pipe by an MCVD technique, and then the rod 30 may be inserted into this pipe so as to enhance the opening.

The inventors carried out experiments in which optical fibers were produced with different buffer layer thicknesses, and influences of the buffer layer thickness were compared with each other. Their results will now be reported.

First, influences of the inner buffer layer thickness were studied. Optical fibers produced according to the above-mentioned first manufacturing method were used for this comparative experiment, and their basic configurations are shown in Table 1.

TABLE 1

|  | Type 1 | Type 2 | Type 3 |
|---|---|---|---|
| Center core region diameter 2a |  | 4.0 μm |  |
| Ring core region thickness $t_b$ |  | 7.5 μm |  |
| Inner cladding region thickness $t_c$ |  | 12.0 μm |  |
| Inner buffer layer thickness $t_1$ |  | 0.001 μm to 5 μm |  |
| Outer buffer layer thickness $t_2$ |  | 0.5 μm |  |
| F conc. of center core region | 0.5 wt % | 1.5 wt % | 2.5 wt % |
| $GeO_2$ conc. of ring core region |  | 18 wt % |  |
| F conc. of inner cladding region |  | 0.5 wt % |  |

Figure 10:
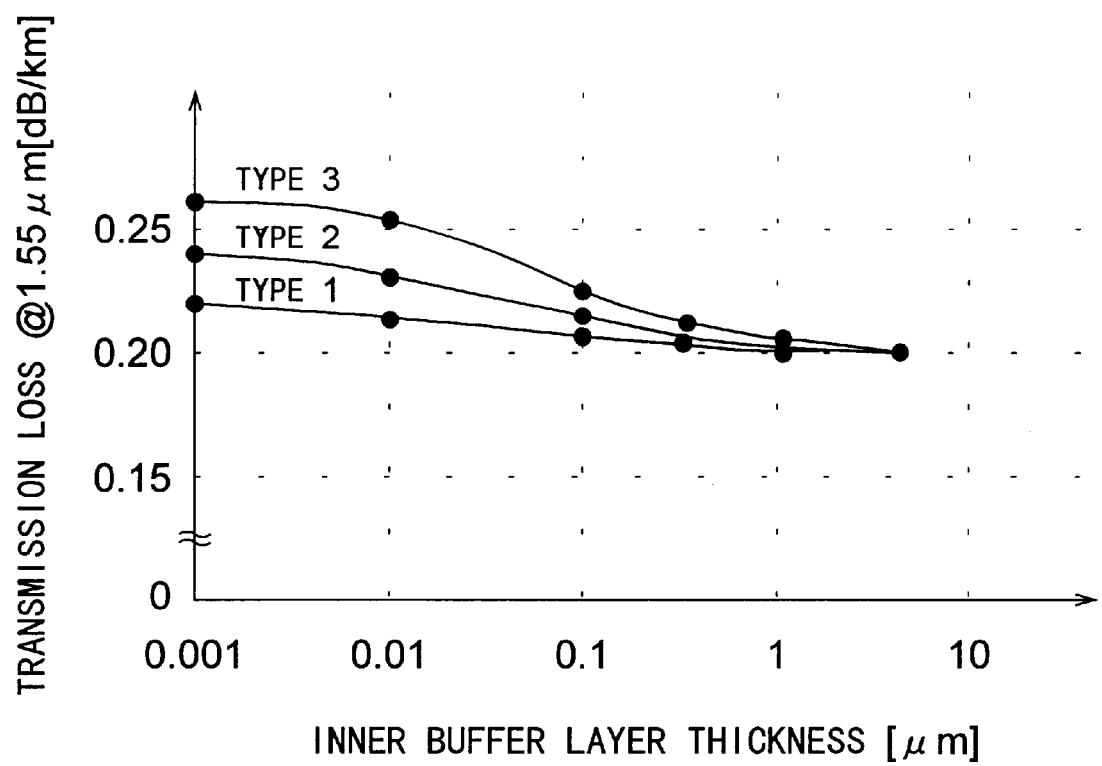

FIG. 10 summarizes the change in transmission loss in each type of the optical fibers with respect to the thickness of the inner buffer layer, in which the abscissa indicates the varied inner buffer layer thickness, whereas the ordinate indicates the transmission loss at a wavelength of 1.55 μm. As the inner buffer layer became thicker, the transmission loss was reduced. When the inner buffer layer thickness exceeded 1 μm, there was substantially no difference in transmission loss even when the F element concentration of center core region differed. Based on the transmission loss alone, the inner buffer layer was preferably as thick as possible, and it was found preferable to have a thickness of at least 0.01 μm.

Figure 11:
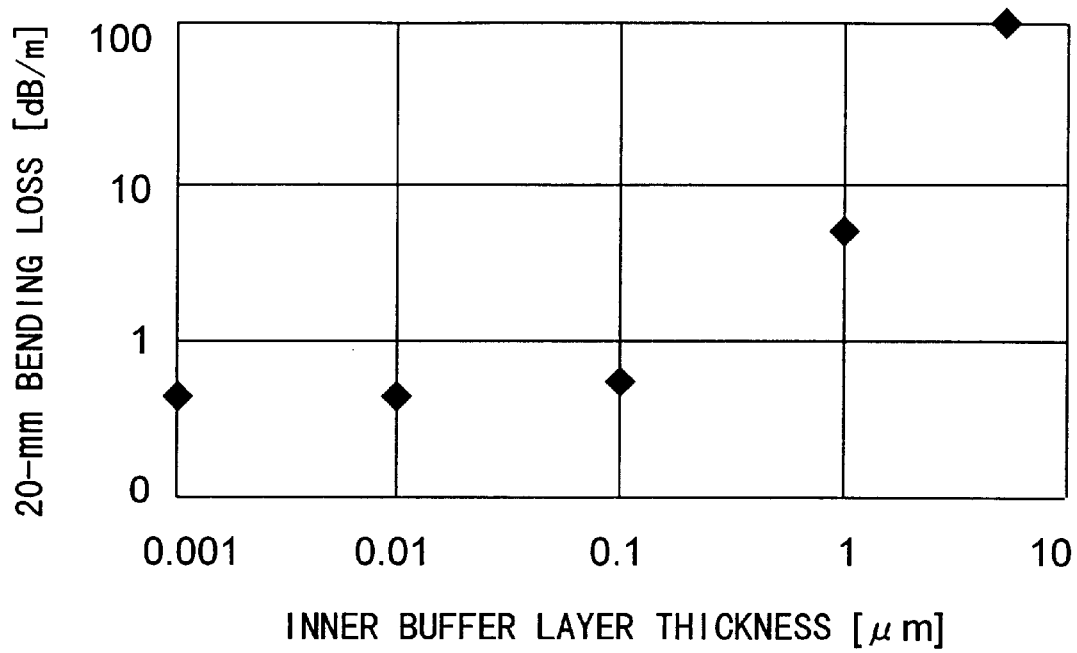
FIG. 11 is a graph showing relationships between the thickness of the inner buffer layer and the bending loss in optical fibers.

Table 2 lists transmission characteristics of five optical fibers with different inner buffer thicknesses among those of type 2 at the wavelength of 1.55 μm, whereas FIG. 11 is a graph of changes in bending loss at the wavelength of 1.55 μm with respect to the buffer layer thickness when these optical fibers were bent at a diameter of 20 mm (called as 20ϕ bending loss).

TABLE 2

| Inner buffer layer thickness (μm) | 0.001 | 0.01 | 0.1 | 1 | 5 |
|---|---|---|---|---|---|
| Dispersion (ps/km/nm) | −3.4 | −3.4 | −3.5 | −1.0 | 5 |
| Dispersion slope (ps/km/nm²) | 0.077 | 0.078 | 0.077 | 0.075 | 0.084 |
| Aeff (μm²) | 83 | 84 | 85 | 89 | 160 |
| 20ϕ bending loss (dB/m) | 0.4 | 0.4 | 0.6 | 5.0 | 100 |

It can be seen that the bending loss increases as the inner buffer layer becomes thicker. From this viewpoint, it is preferred that the thickness of the inner buffer layer be 5 μm or less. From the foregoing results, it has been found preferable for the inner buffer layer to have a thickness of 0.01 μm to 5 μm.

Next, influences of the outer buffer layer thickness were studied. Optical fibers produced according to the above-mentioned first manufacturing method were also used for this comparative experiment, and their basic configurations are shown in Table 3.

TABLE 3

|  | Type 4 | Type 5 | Type 6 |
|---|---|---|---|
| Center core region diameter 2a |  | 3.6 μm |  |
| Ring core region thickness $t_b$ |  | 1.5 μm |  |
| Inner cladding region thickness $t_c$ |  | 2.8 μm |  |
| Inner buffer layer thickness $t_1$ |  | 0.4 μm |  |
| Outer buffer layer thickness $t_2$ |  | 0.001 μm to 5 μm |  |
| F conc. of center core region |  | 1.5 wt % |  |
| $GeO_2$ conc. of ring core region |  | 17 wt % |  |
| F conc. of inner cladding region | 0.3 wt % | 0.5 wt % | 1.5 wt % |

Figure 12:
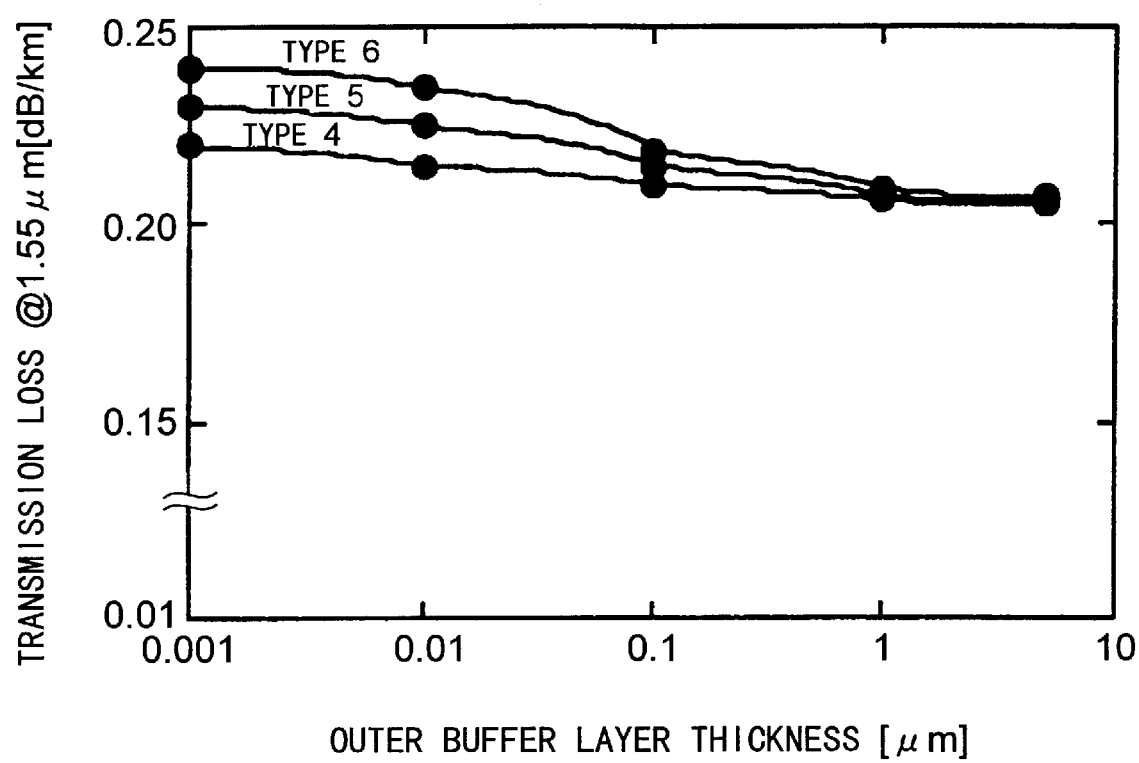

FIG. 12 summarizes the change in transmission loss in each type of the optical fibers with respect to the thickness of the outer buffer layer, in which the abscissa indicates the varied outer buffer layer thickness, whereas the ordinate indicates the transmission loss at a wavelength of 1.55 μm. As with the inner buffer layer, as the outer buffer layer became thicker, the transmission loss was reduced. When the outer buffer layer thickness exceeded 1 μm, there was substantially no difference in transmission loss even when the F element concentration of center core region differed. Based on the transmission loss alone, the outer buffer layer was preferably as thick as possible, and it was found preferable to have a thickness of at least 0.01 μm.

Figure 13:
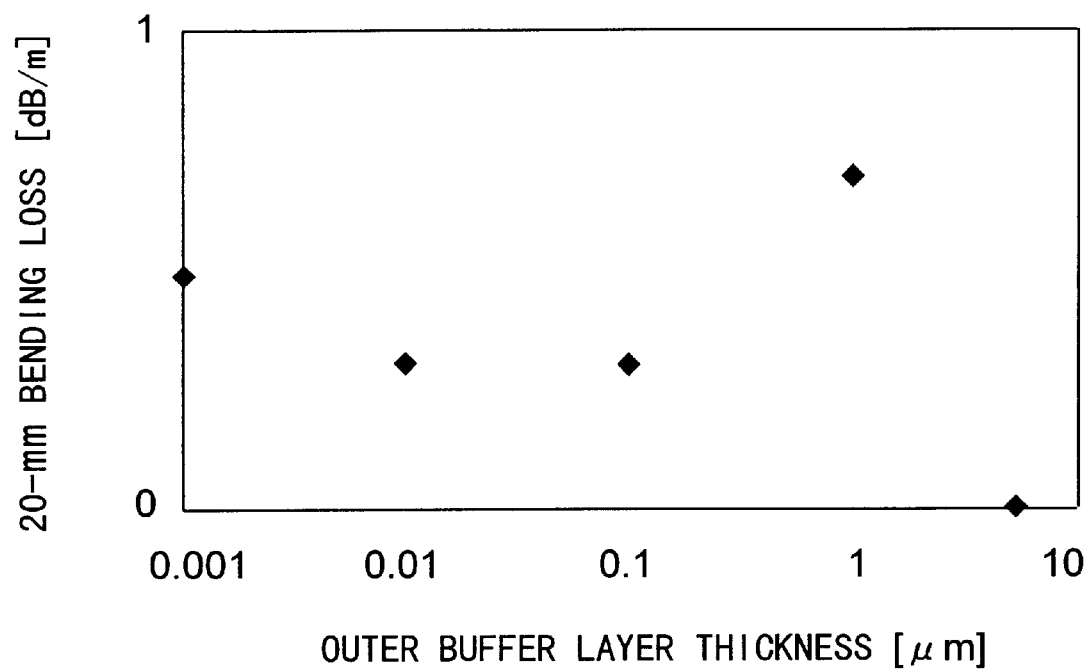
FIG. 13 is a graph showing relationships between the thickness of the outer buffer layer and the bending loss in optical fibers.

Table 4 lists transmission characteristics of five optical fibers with different outer buffer thicknesses among those of type 5 at the wavelength of 1.55 μm, whereas FIG. 13 is a graph of changes in bending loss at the wavelength of 1.55 μm with respect to the outer buffer layer thickness when these optical fibers were bent at a diameter of 20 mm.

TABLE 4

| Outer buffer layer thickness (μm) | 0.001 | 0.01 | 0.1 | 1 | 5 |
|---|---|---|---|---|---|
| Dispersion (ps/km/nm) | −2.0 | −1.9 | −2.1 | 1.0 | 4.0 |
| Dispersion slope (ps/km/nm²) | 0.075 | 0.074 | 0.075 | 0.074 | 0.084 |
| Aeff (μm²) | 75 | 77 | 75 | 73 | 78 |
| 20ϕ bending loss (dB/m) | 0.3 | 0.2 | 0.2 | 0.4 | 0.1 |

In the case of the outer buffer layer, though the dispersion value increases as the buffer layer is made thicker, no deterioration in bending loss or the like is seen, unlike the above-mentioned case of the inner buffer layer. As a consequence, it has been found that the outer buffer layer can be made thicker if it is at least 0.01 μm.

Figure 14:
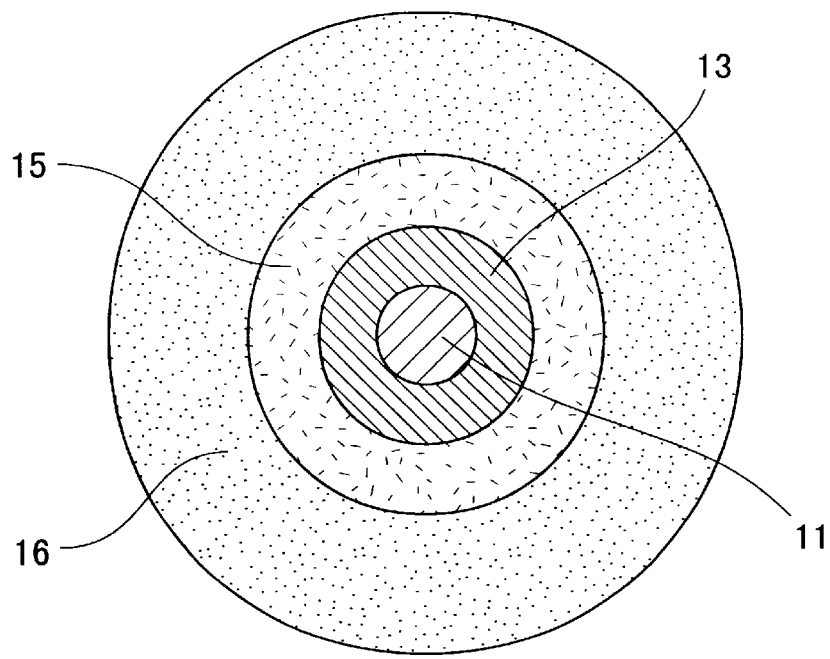

A second embodiment of the optical fiber in accordance with the present invention will now be explained. FIG. 14 is a view showing a cross-sectional structure thereof, whereas FIG. 15 shows the refractive index profile thereof.

Figure 15:
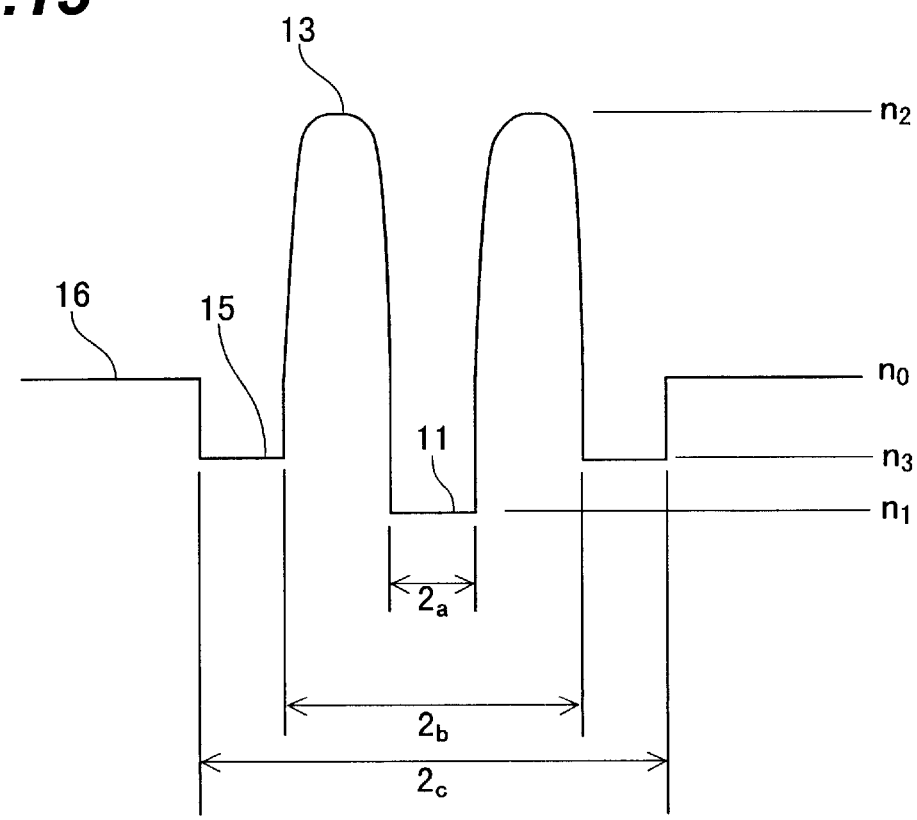
FIG. 15 is a chart showing the refractive index profile thereof.

The optical fiber in accordance with the second embodiment is made of silica glass, and is constituted, as shown in FIGS. 14 and 15, by a center core region 11 (having an outside diameter 2a), a ring core region 13 (having an outside diameter 2b and a thickness $t_b$), an inner cladding region 15 (having an outside diameter 2c and a thickness $t_c$), and an outer cladding region 16 which are concentrically arranged successively from the center. It differs from the first embodiment shown in FIGS. 1 and 2 in that it does not include the buffer layers 12, 14 existing in the first embodiment, and that the radial distribution of the refractive index in the ring core region is not uniform but attains a maximum value $n_2$ in a middle portion. This structure is realized by radially changing the $GeO_2$ concentration in the ring core region 13 such that the concentration is lower in the boundary portion between the center core region 11 and inner cladding region 15 and higher in the middle portion.

Here, the concentration of $GeO_2$ is preferably set such that, letting $C_G(r)$ [wt %] be the concentration of $GeO_2$ in the ring core region 13 at a position separated from the center by the radius r [μm], the concentration gradient $y_{G1}$ [wt %·μm²] of $GeO_2$ in the boundary portion of the ring core region 13 with respect to the center core region 11 defined by the above-mentioned equation (1):

$$y_{G1} = \int_{a}^{a+1} (rC_G(r)\exp(a-r))\,dr \qquad (1)$$

is 100 wt %·μm² or less, and the concentration gradient $y_{G2}$ [wt %·μm²] of GeO₂ in the boundary portion of the ring core region 13 with respect to the inner cladding region 15 defined by the above-mentioned equation (3):

$$y_{G2} = \int_{b-1}^{b} (rC_G(r)\exp(r-b))\,dr \qquad (3)$$

is 180 wt %·μm² or less. Here, $y_{G1}$=0 and $y_{G2}$=0 means that there is a buffer region 1 micrometers in thickness respectively.

Figure 16:
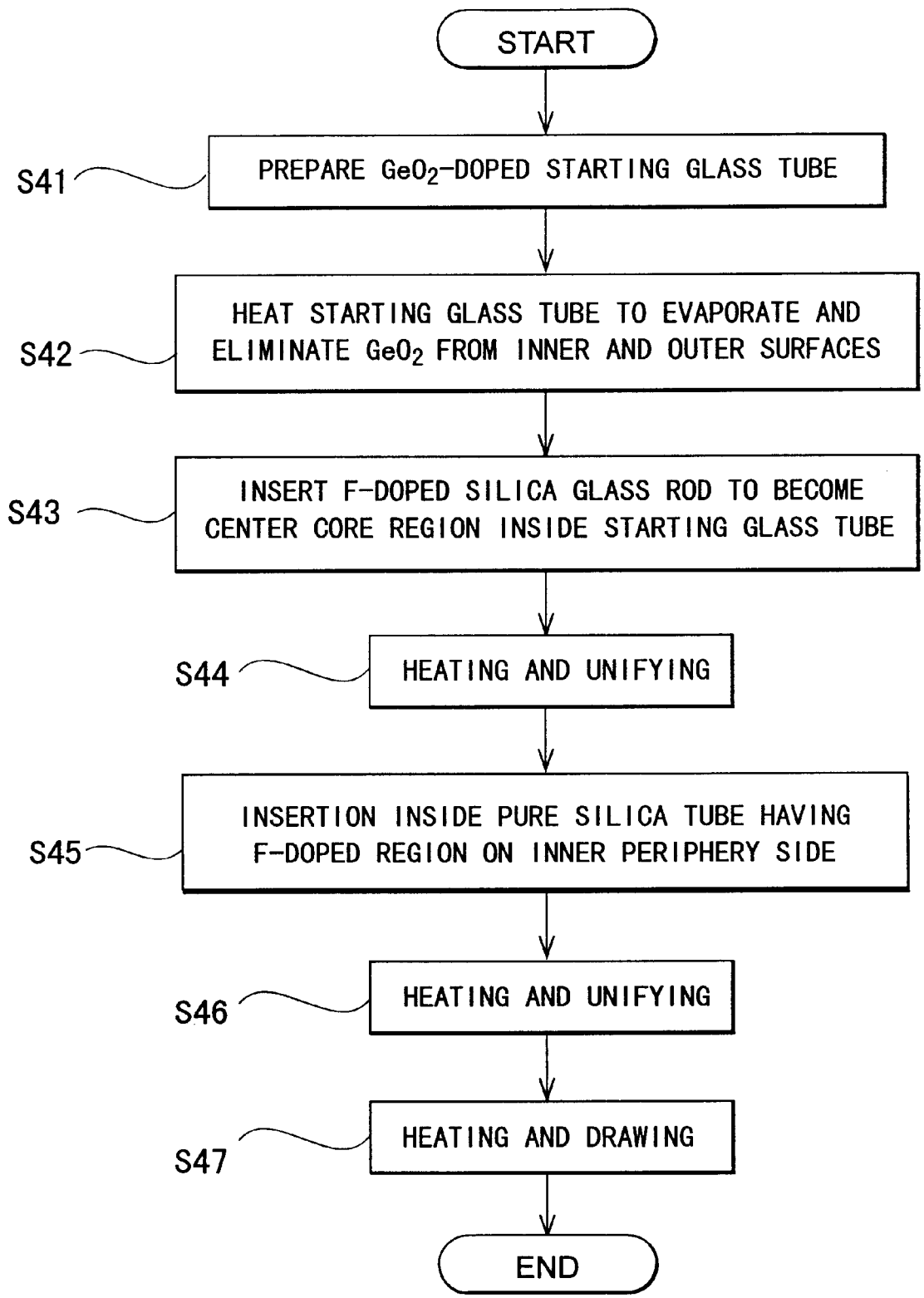

An example of the method of making this optical fiber will be explained in the following. FIG. 16 is a flowchart showing this manufacturing method, whereas FIGS. 17A to 17F are lateral sectional views showing the respective intermediate products at individual steps thereof.

Figure 17A:
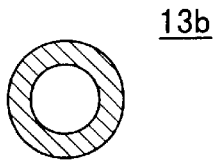
FIGS. 17A to 17F are lateral sectional views showing the respective intermediate products at individual steps thereof.

First, at step S41, a starting glass tube 13b made of GeO₂-doped silica glass is prepared (FIG. 17A). This starting glass tube 13b becomes the ring core region 13. The GeO₂ concentration distribution is uniform within the glass tube 13b, and the concentration is 10 wt % to 40 wt %.

Figure 17B:
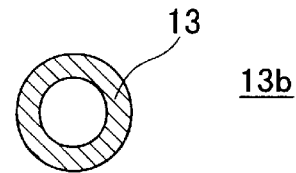
Figure 17C:
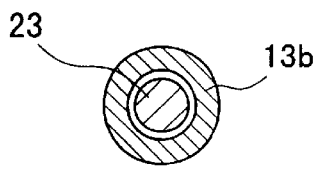

Subsequently, at step S42, the starting glass tube 13b is heated, so as to evaporate GeO₂ from the inner and outer peripheries thereof and eliminate GeO₂ from the regions in the vicinity of the inner and outer peripheries, thereby yielding the ring core region 13 having a refractive index profile such as that shown in FIG. 15 (FIG. 17B).

Figure 17D:
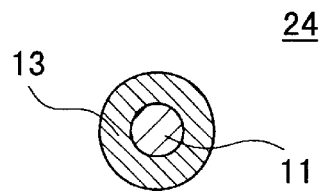
Figure 17E:
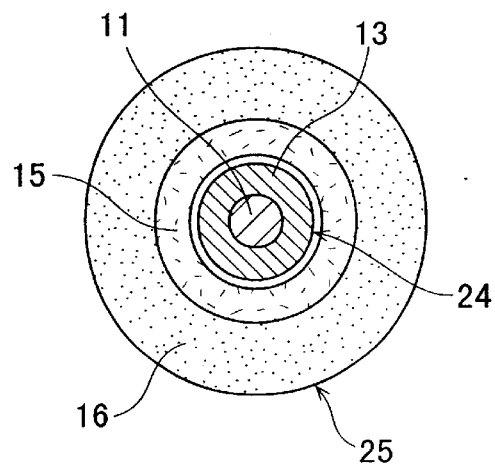
Figure 17F:
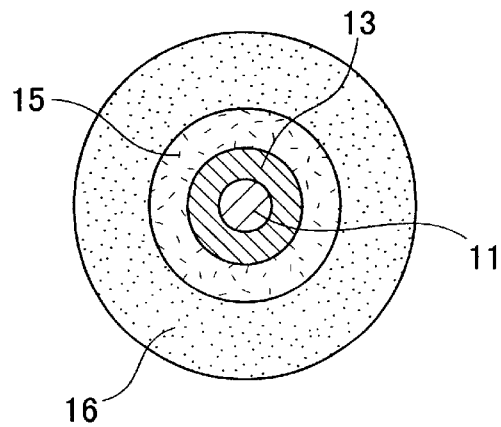

A silica glass rod 23 doped with F element, which is to become the center core region 11, is inserted into the inside of the starting glass tube 13b at step S43 (FIG. 17C), and is heated at step S44 so as to unify them, thereby yielding a multilayer glass rod 24 (FIG. 17D).

Since the respective steps of S45 to S47 (FIGS. 17E and 17F) are similar to steps of S25 to S27 (FIGS. 6E and 6F) shown in FIG. 5, they will not be explained here. Hence, an optical fiber preform having the refractive index profile shown in FIG. 15 is yielded, and an optical fiber is obtained when this optical fiber preform is drawn.

In this embodiment, at the time of heating and drawing, the diffusion of Ge atoms from the ring core region 13 to the center core region 11 and inner cladding region 15 is restrained since their diffusion velocities are suppressed because of the fact that the concentration gradient of GeO₂ is set low in their boundary portions. Together therewith, the inflow of F atoms in the opposite directions is restrained. As a result, an optical fiber can be made while the ring core region 13 is kept at a high refractive index state. Consequently, an optical fiber having favorable characteristics as a dispersion-shifted fiber can be obtained.

As a matter of course, a known VAD technique or OVD technique may be used so as to radially change the doping GeO₂ concentration, thereby forming the ring core region 13. Further, glass may be deposited while varying its GeO₂ concentration onto the inner and outer peripheral faces of a glass tube having a uniform doped GeO₂ concentration, so as to form a concentration gradient region. Alternatively, a known MCVD technique may be used such that the doping GeO₂ concentration at the time when depositing a synthetic glass layer on the inner face of a pure silica or fluorine-doped silica glass pipe successively becomes lower, higher, and lower, so as to form a concentration gradient region.

The inventors carried out experiments in which optical fibers were produced with different GeO₂ concentration gradients $y_{G1}$, $y_{G2}$ in the boundary portions on both sides of the ring core region 13, and influences of the concentration gradients were compared with each other. Their results will now be reported.

First, influences of the GeO₂ concentration gradient $y_{G1}$ in the boundary portion between the ring core region 13 and the center core region 11 were studied. Optical fibers produced according to the above-mentioned manufacturing method were used for this comparative experiment. Their basic configurations are shown in Table 5.

TABLE 5

|  | Type 7 | Type 8 | Type 9 |
|---|---|---|---|
| Center core region diameter 2a |  | 5.0 μm |  |
| Ring core region diameter 2b |  | 8.3 μm |  |
| Inner cladding region diameter 2c |  | 14.0 μm |  |
| concentration gradient $y_{G1}$ |  | 10 to 150 wt %·μm² |  |
| F conc. of center core region |  | 1.5 wt % |  |
| GeO₂ peak conc. of ring core region | 20 wt % | 30 wt % | 40 wt % |
| F conc. of inner cladding region |  | 0.5 wt % |  |

Figure 18:
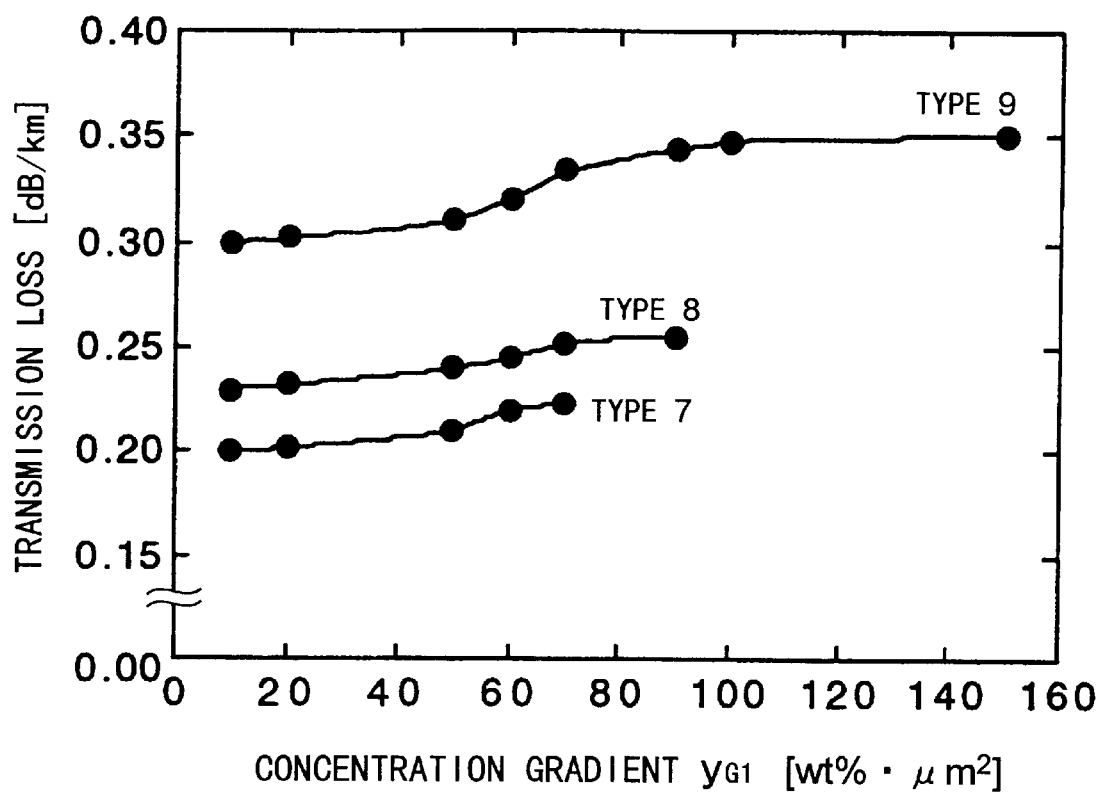
FIG. 18 is a graph showing relationships between the $GeO_2$ concentration gradient $y_{G1}$ in the inner boundary of a ring core region and the transmission loss in optical fibers.

FIG. 18 summarizes the results of the comparative experiment, in which the abscissa indicates the varied values of GeO₂ concentration gradient $y_{G1}$ in the inner interface of the ring core region 13, whereas the ordinate indicates the transmission loss at the wavelength of 1.55 μm. Though no difference is seen in the case where the concentration gradient $y_{G1}$ exceeds 100 wt %·μm², the transmission loss becomes smaller as the concentration gradient $y_{G1}$ is made lower when it is not greater than 100 wt %·μm². From this point, it has been found preferable for the GeO₂ concentration gradient $y_{G1}$ in the inner interface of the ring core region 13 to be 100 wt %·μm² or less.

Next, influences of the GeO₂ concentration gradient $y_{G2}$ in the boundary portion between the ring core region 13 and the inner cladding region 15 were studied. Optical fibers produced according to the above-mentioned ;manufacturing method were used for this comparative experiment as well. Their basic configurations are shown in Table 6.

TABLE 6

|  | Type 10 | Type 11 | Type 12 |
|---|---|---|---|
| Center core region diameter 2a |  | 4.5 μm |  |
| Ring core region diameter 2b |  | 8.0 μm |  |
| Inner cladding region diameter 2c |  | 13.0 μm |  |
| concentration gradient $y_{G2}$ |  | 1 to 200 wt %·μm² |  |
| F conc. of center core region |  | 1.5 wt % |  |
| GeO₂ peak conc. of ring core region | 20 wt % | 30 wt % | 40 wt % |
| F conc. of inner cladding region |  | 1.0 wt % |  |

Figure 19:
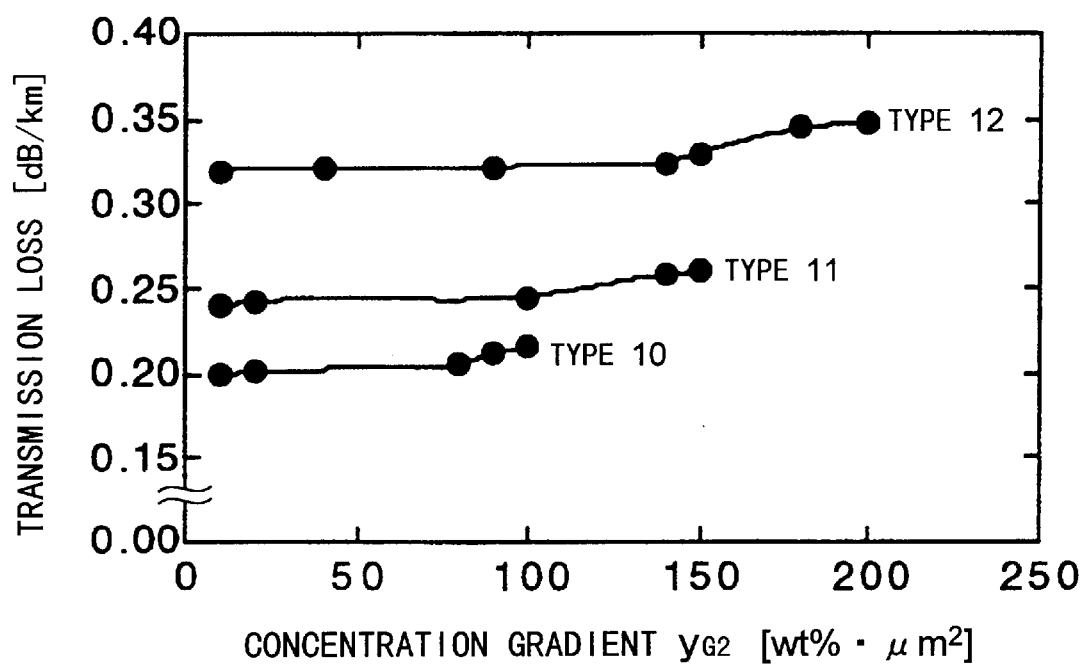
FIG. 19 is a graph showing relationships between the $GeO_2$ concentration gradient $y_{G2}$ in the outer boundary of the ring core region and the transmission loss in optical fibers.

FIG. 19 summarizes the results of the comparative experiment, in which the abscissa indicates the varied values of GeO₂ concentration gradient $y_{G2}$ in the outer interface of the ring core region 13, whereas the ordinate indicates the transmission loss at the wavelength of 1.55 μm. As with the above-mentioned concentration gradient $y_{G1}$, though no difference is seen in the case where the concentration gradient $y_{G2}$ is at a predetermined value or greater, exceeding 180 wt %·μm² in this case, the transmission loss becomes smaller as the concentration gradient $y_{G2}$ is made lower when it is not greater than 180 wt %·μm². From this point, it has been found preferable for the concentration gradient $y_{G2}$ in the outer interface of the ring core region 13 to be 180 wt %·μm² or less.

Though the foregoing two embodiments are explained as embodiments in which both of the ring core region and center core region or both of the ring core region and inner cladding region are provided with buffer layers, or both of the ring core region and center core region or both of the ring core region and inner cladding region are provided with concentration gradient regions; one of them may be provided with a buffer layer, while the other is provided with a concentration gradient region.

Figure 20:
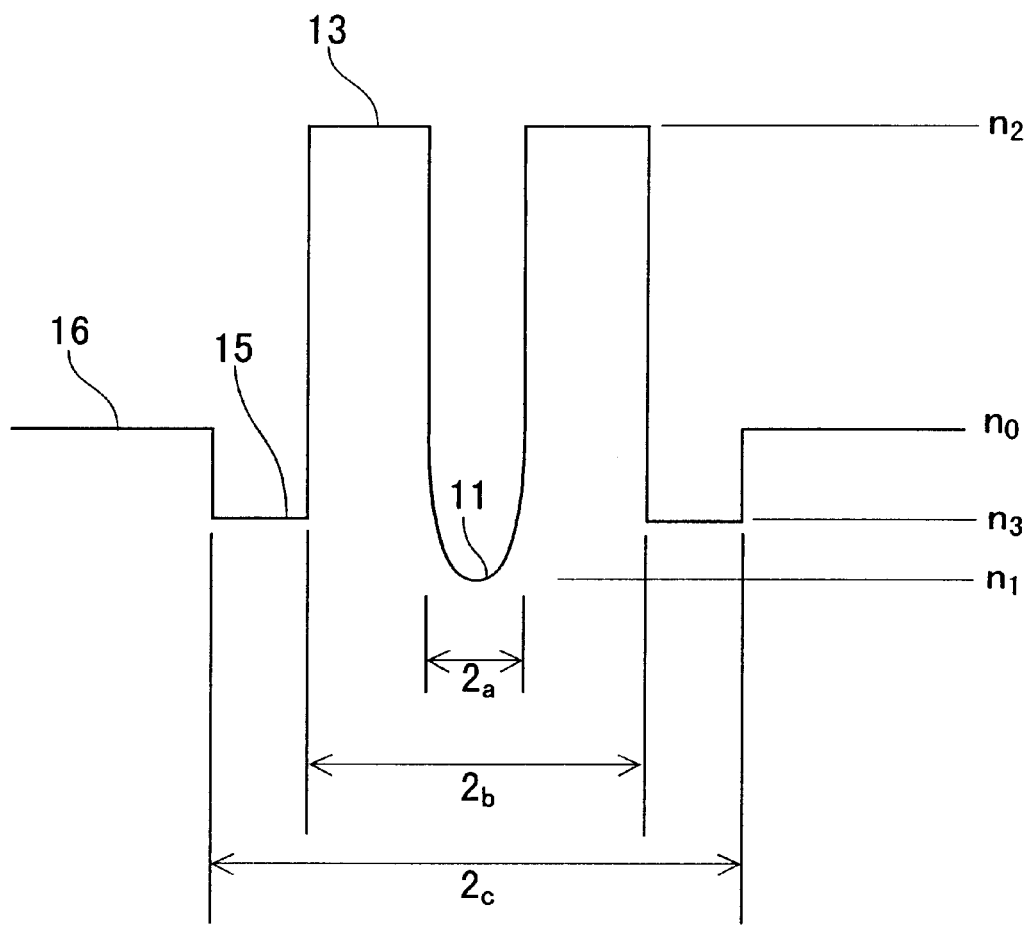
FIG. 20 is a chart showing the refractive index profile of a third embodiment of the optical fiber in accordance with the present invention.

A third embodiment of the optical fiber in accordance with the present invention will now be explained. The cross-sectional structure of this embodiment is similar to that in the second embodiment shown in FIG. 14 but differs therefrom in that it has the refractive index profile shown in FIG. 20. Namely, while the radial distribution of refractive index in the ring core region 13 is made uniform, the radial distribution of refractive index in the center core region 11 is not uniform but attains a minimum value $n_1$ in the center portion thereof. That is, a concentration gradient region exists only in the inside of the ring core region 13. This structure is realized by gradually decreasing the F concentration in the center core region 11 from the center portion to the boundary portion with respect to the ring core region 13. Preferably, this concentration distribution is set such that, letting $C_F(r)$ [wt %] be the concentration of F element at a position in the center core region 11 separated from the center by the radius r [μm], the concentration gradient $y_{F1}$ [wt %·μm$^2$] of F in the boundary portion of the center core region 11 with respect to the ring core region 13 defined by the above-mentioned equation (2):

$$y_{F1} = \int_{a-1}^{a} (rC_F(r)\exp(r-a))dr \quad (2)$$

is 18 wt %·μm$^2$ or less. In the case of $y_{F1}$=0, the thickness of inner buffer layer is 1 μm.

This optical fiber can be made by the steps of preparing, as a multilayer silica glass tube, the ring core region 13 and the regions outside thereof excluding the center core region 11; inserting a silica glass rod having a higher F-doping concentration in the center portion thereof into the inside of the glass tube; heating and unifying them together, so as to yield an optical fiber preform; and drawing this optical fiber preform.

The inventors carried out a comparative experiment in which optical fibers were produced with different F element concentration gradients $y_{F1}$ in the outer boundary portion of the center core region 11, and influences of the concentration gradients $y_{F1}$ were compared with each other. The results will now be reported.

Table 7 shows basic configurations of the optical fibers used for the comparative experiment.

TABLE 7

|  | Type 13 | Type 14 |
| --- | --- | --- |
| Center core region diameter 2a | 5.0 μm | |
| Ring core region diameter 2b | 8.3 μm | |
| Inner cladding region diameter 2c | 14 μm | |
| Concentration gradient $y_{F1}$ | 5 to 20 wt % · μm$^2$ | |
| F peak conc. of center core region | 1.5 wt % | 2.5 wt % |
| GeO$_2$ conc. of ring core region | 20 wt % | |
| F conc. of inner cladding region | 0.5 wt % | |

Figure 21:
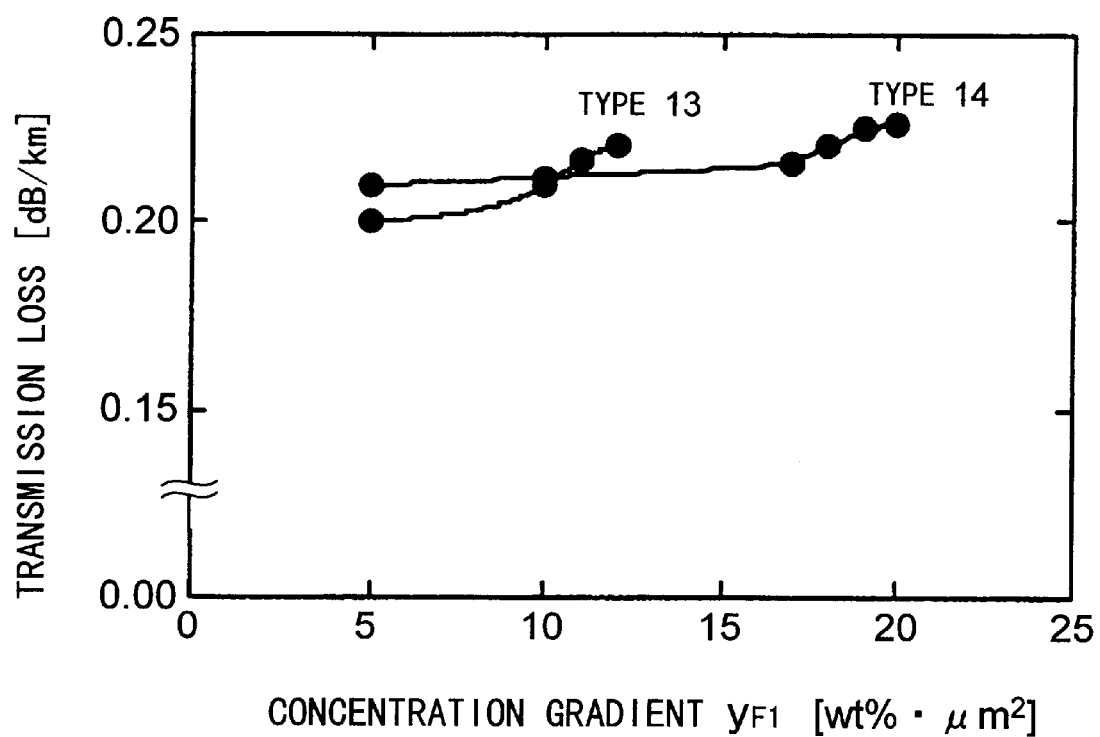
FIG. 21 is a graph showing relationships between the F element concentration gradient $y_{F1}$ in the outer boundary of a center core region and the transmission loss in optical fibers.

FIG. 21 summarizes the results of the comparative experiment, in which the abscissa indicates the varied values of concentration gradient $y_{F1}$, whereas the ordinate indicates the transmission loss at the wavelength of 1.55 μm. It was found that the transmission loss was reduced as the concentration gradient $y_{F1}$ became lower, with its reducing effect being greater at 18 wt %·μm$^2$ or less. Therefore, the concentration gradient $y_{F1}$ is preferably 18 wt %·μm$^2$ or less.

Figure 22:
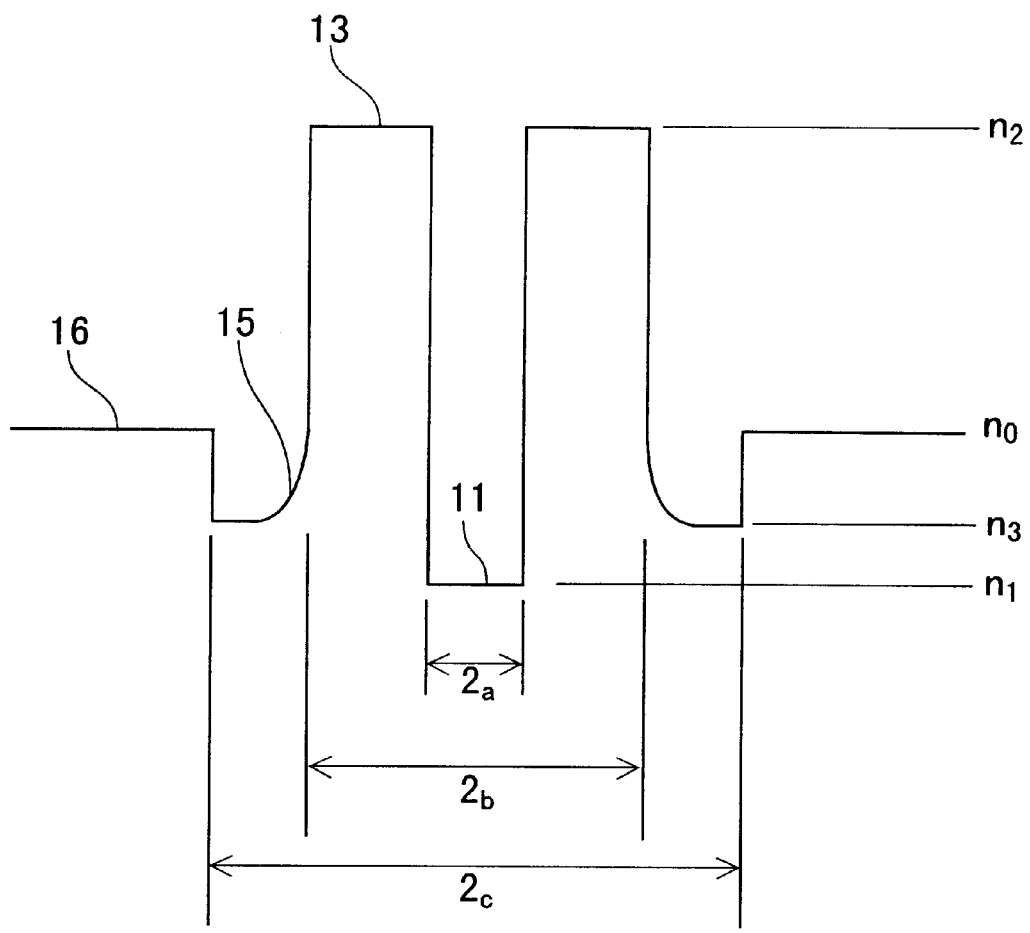
FIG. 22 is a chart showing the refractive index profile of a fourth embodiment of the optical fiber in accordance with the present invention.

A fourth embodiment of the optical fiber in accordance with the present invention will now be explained. The cross-sectional structure of this embodiment is similar to that in the second embodiment shown in FIG. 14 but differs therefrom in that it has the refractive index profile shown in FIG. 22. Namely, while the radial distribution of refractive index in the ring core region 13 is made uniform, the radial distribution of refractive index in the inner cladding region 15 is not uniform but attains a minimum value $n_3$ in the outer portion thereof. That is, a concentration gradient region exists only in the outside of the ring core region 13. This structure is realized by gradually increasing the F concentration in the inner cladding region 15 from the boundary portion with respect to the ring core region 13 to the outside. Preferably, this concentration distribution is set such that, letting $C_F(r)$ [wt %] be the concentration of F element at a position in the inner cladding region 15 separated from the center by the radius r [μm], the concentration gradient $y_{F2}$ [wt %·μm$^2$] of F in the boundary portion of the inner cladding region 15 with respect to the ring core region 13 defined by the above-mentioned equation (4):

$$y_{F2} = \int_{b}^{b+1} (rC_F(r)\exp(b-r))dr \quad (4)$$

is 30 wt %·μm$^2$ or less. In the case of $y_{F2}$=0, the thickness of inner buffer layer is 1 μm.

This optical fiber can be made by the steps of preparing, as a multilayer silica glass rod, the ring core region 13 and region inside thereof; inserting it into a silica glass tube having an F-doped region on the inner side thereof with its concentration distribution becoming lower in the inner side; heating and unifying them together, so as to yield an optical fiber preform; and drawing this optical fiber preform.

The inventors carried out a comparative experiment in which optical fibers were produced with different F element concentration gradients $y_{F2}$ in the inner boundary portion of the inner cladding region 15, and influences of the concentration gradients $y_{F2}$ were compared with each other. The results will now be reported.

Table 8 shows basic configurations of the optical fibers used for the comparative experiment.

TABLE 8

|  | Type 15 | Type 16 |
| --- | --- | --- |
| Center core region diameter 2a | 4.6 μm | |
| Ring core region diameter 2b | 8.0 μm | |
| Inner cladding region diameter 2c | 14 μm | |
| F conc. of center core region | 1.5 wt % | |
| GeO$_2$ conc. of ring core region | 20 wt % | |
| concentration gradient $y_{F2}$ | 5 to 40 wt % · μm$^2$ | |
| F peak conc. of inner cladding region | 1.5 wt % | 2.5 wt % |

Figure 23:
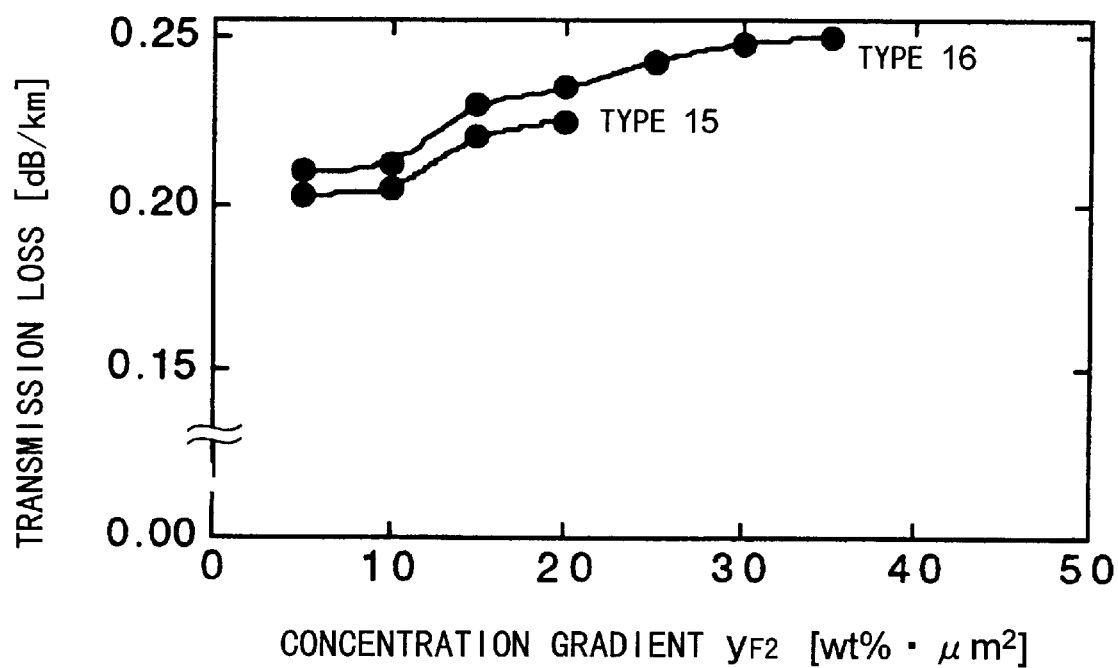
FIG. 23 is a graph showing relationships between the F element concentration gradient $y_{F2}$ in the inner boundary of an inner cladding region and the transmission loss in optical fibers.

FIG. 23 summarizes the results of the comparative experiment, in which the abscissa indicates the varied values of concentration gradient $y_{F2}$, whereas the ordinate indicates the transmission loss at the wavelength of 1.55 μm. It was found that the transmission loss was reduced as the concentration gradient $y_{F2}$ became lower, with its reducing effect being greater at 30 wt %·μm$^2$ or less. Therefore, the concentration gradient $y_{F2}$ is preferably 30 wt %·μm$^2$ or less.

The buffer layers or concentration gradient regions formed on both sides of the ring core region can produce various types of optical fibers by combining the foregoing embodiments.

Figure 24A:
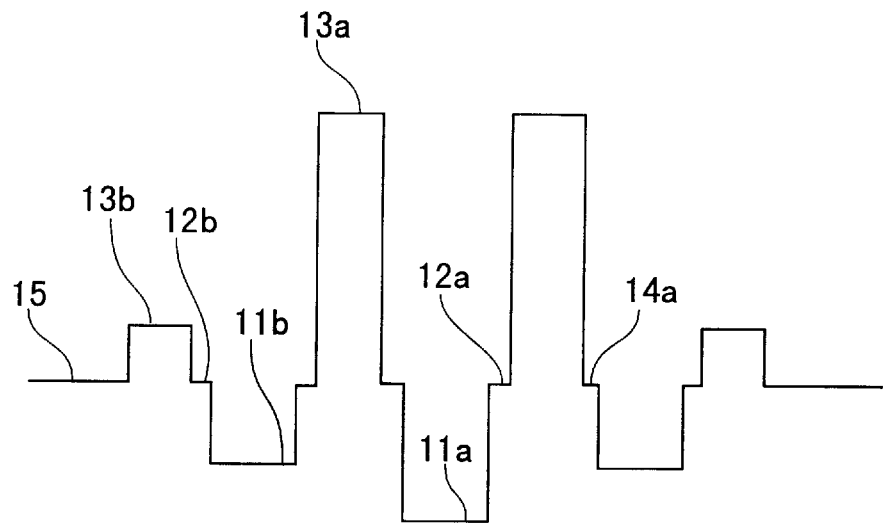
FIGS. 24A and 24B are charts showing respective refractive index profiles of other embodiments of the optical fiber in accordance with the present invention.
Figure 24B:
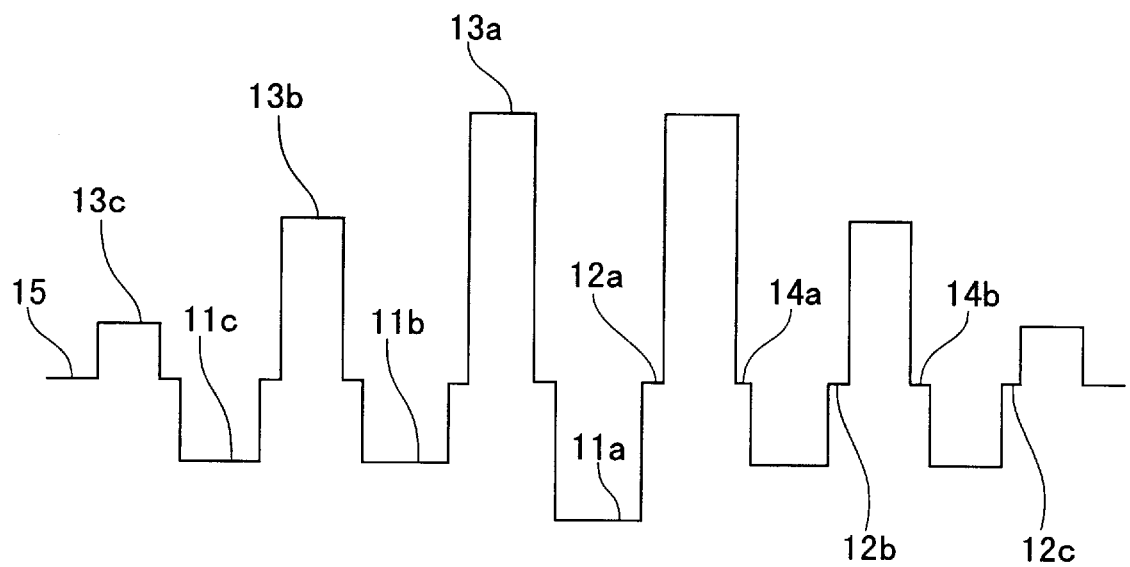

Further, the ring core region 13 is not restricted to a single one shown in FIG. 1, 14, 20, or 22, but a plurality of ring core regions 13 having a higher refractive index may be disposed in a multilayer form as shown in FIG. 24A or 24B. Preferably, in this case, buffer layers 12, 14 or concentration gradient regions are disposed between the individual $GeO_2$-doped higher refractive index regions 13 and F-doped low refractive index regions 11 in the ring core regions.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber, composed of silica glass, having a center core region, a ring core region doped with germanium dioxide, and a cladding region, all of which are arranged concentrically;

wherein at least one of said center core region and the cladding region is doped with fluorine element, the refractive index of said center core region is lower than that of said ring core region; and said optical fiber further comprising a buffer layer disposed between said ring core region and said region doped with fluorine element, said buffer layer being composed of undoped silicon dioxide or silicon dioxide doped with one or both of phosphorus and chlorine.

2. An optical fiber according to claim 1, wherein said center core region is doped with fluorine element; and said buffer layer is disposed between said center core region and said ring core region.

3. An optical fiber according to claim 1, wherein said buffer layer has a thickness of at least 0.01 $\mu$m but not greater than 5 $\mu$m.

4. An optical fiber according to claim 1, wherein said cladding region has an inner cladding region doped with fluorine element; and said buffer layer is disposed between said ring core region and said inner cladding region.

5. An optical fiber according to claim 4, wherein said buffer layer has a thickness of at least 0.01 $\mu$m.

6. An optical fiber according to claim 1, wherein a chromatic dispersion at the wavelength of 1.55 $\mu$m of said optical fiber is within the range from 1.9–4.0 ps/km/nm.

7. An optical fiber according to claim 1, wherein a transmission loss at the wavelength of 1.55 $\mu$m of said optical fiber is 0.25 dB/km or less.

8. An optical fiber according to claim 7, wherein a transmission loss at the wavelength of 1.55 $\mu$m of said optical fiber is 0.20 dB/km or more.

* * * * *